US008570551B2

(12) United States Patent
Osada

(10) Patent No.: US 8,570,551 B2
(45) Date of Patent: Oct. 29, 2013

(54) INFORMATION PROCESSING APPARATUS, INFORMATION PROCESSING METHOD, AND COMPUTER PROGRAM CAPABLE OF PROVIDING USEFUL INFORMATION TO A USER BASED ON LOGS STORED IN A PRINTING SYSTEM AND IMPROVING THE USABILITY OF EACH USER WHO OPERATES A PRINTING SYSTEM

(75) Inventor: Tomoaki Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 990 days.

(21) Appl. No.: 12/038,748

(22) Filed: Feb. 27, 2008

(65) Prior Publication Data

US 2008/0212131 A1    Sep. 4, 2008

(30) Foreign Application Priority Data

Mar. 2, 2007  (JP) .................... 2007-053053

(51) Int. Cl.
*G06K 15/00*  (2006.01)
*G06F 3/12*   (2006.01)
*G06F 7/00*   (2006.01)
*G06F 17/30*  (2006.01)
*H04N 1/40*   (2006.01)

(52) U.S. Cl.
USPC ....... 358/1.15; 358/1.14; 358/1.16; 358/2.99; 358/3.23; 707/672; 707/751; 707/768

(58) Field of Classification Search
USPC ............... 358/1.15, 1.14, 1.1, 1.12, 2.1, 2.99, 358/3.23, 3.24, 1.16, 501, 462; 382/100, 382/218, 219, 183, 224, 206, 248, 203, 382/217; 709/221, 224, 206, 248, 203, 217; 707/600, 602, 603, 609, 627, 636, 672, 707/673, 705, 736, 740, 741, 751, 776, 661, 707/768, 802
See application file for complete search history.

(56) References Cited

U.S. PATENT DOCUMENTS 6,243,792 B1 *  6/2001  Chang ..................... 711/136
(Continued)

FOREIGN PATENT DOCUMENTS

| EP | 1538523 A2 | 6/2005 |
|----|------------|--------|
| JP | 2000-235466 A | 8/2000 |
| JP | 2002-207726 A | 7/2002 |
| JP | 2003-127473 A | 5/2003 |

(Continued)

*Primary Examiner* — Benny Tieu
*Assistant Examiner* — Ngon Nguyen
(74) *Attorney, Agent, or Firm* — Canon U.S.A., Inc., IP Division

(57) ABSTRACT

A printing system includes a storage unit (HD) adapted to store a print logs relating to each of a plurality of print data having been printed, the print log including relevant information relating to the print data; a reception unit adapted to receive relevant information relating to print data to be printed; a search unit adapted to search a print log including the relevant information received by the reception unit from the print logs stored in the storage unit; and a display unit adapted to display information indicating a print apparatus that has printed print data corresponding to the print log found by the search unit, which is extracted from the relevant information included in the print log found by the search unit.

11 Claims, 25 Drawing Sheets

(56) References Cited

U.S. PATENT DOCUMENTS

| | | | |
|---|---|---|---|
| 6,567,176 B1* | 5/2003 | Jeyachandran et al. | 358/1.14 |
| 6,762,852 B1 | 7/2004 | Fischer | |
| 6,864,992 B1* | 3/2005 | Okada | 358/1.15 |
| 7,054,019 B1* | 5/2006 | Simpson | 358/1.15 |
| 7,865,318 B2* | 1/2011 | Rensing et al. | 702/56 |
| 2004/0107279 A1* | 6/2004 | Kawai | 709/224 |
| 2004/0130743 A1* | 7/2004 | Nozato | 358/1.14 |
| 2007/0050325 A1 | 3/2007 | Nakatomi | |

FOREIGN PATENT DOCUMENTS

| | | |
|---|---|---|
| JP | 2003-186637 A | 7/2003 |
| JP | 2004-118243 A | 4/2004 |
| JP | 2004-302653 A | 10/2004 |
| JP | 2006-137084 A | 6/2006 |
| JP | 2006-159565 A | 6/2006 |
| JP | 2007-037016 A | 2/2007 |
| JP | 2007-041808 A | 2/2007 |
| JP | 2007-122349 A | 5/2007 |

* cited by examiner

FIG.12

| JOB ID=1000023 | ~1201 |
|---|---|
| INPUT DATE/TIME=2006/10/18 15:25:57 | |
| USER ID=078937 | |
| SECURITY LEVEL=E | |
| STORAGE PLACE=\\fileserver1\2006\temp | |
| FILE NAME=BUDGET FOR FISCAL 2006 | |
| TYPE OF FILE=WORDPROCESSOR DATA | |
| PRINTER=32-OA-iRC3300 | |
| LAYOUT={2in1, TWO-SIDED} | |
| KEYWORD={2006 FISCAL YEAR, BUDGET, EQUIPMENT COST} | |
| RELEVANT JOB ID={Prev=NOTHING, Next=1000052} | |

| JOB ID=1000052 | ~1202 |
|---|---|
| INPUT DATE/TIME=2006/10/18 15:28:45 | |
| USER ID=078937 | |
| SECURITY LEVEL=B | |
| STORAGE PLACE=\\BOX89\078937\2006 | |
| FILE NAME=DESIGN DRAWING FOR LIVING ROOM 32 | |
| TYPE OF FILE=GRAPHIC DATA | |
| PRINTER=32-OA-iRC3220 | |
| LAYOUT={HIGH QUALITY, ONE-SIDED, ENLARGEMENT} | |
| KEYWORD={LIVING ROOM 32} | |
| RELEVANT JOB ID={Prev=1000023, Next=1000068} | |

| 1203~ | JOB ID=1000068 |
|---|---|
| | INPUT DATE/TIME=2006/10/18 15:31:15 |
| | USER ID=078937 |
| | SECURITY LEVEL=E |
| | STORAGE PLACE=C:\temp |
| | FILE NAME=WORKER LIST |
| | TYPE OF FILE=TEXT DATA |
| | PRINTER=32-OA-iR3300 |
| | LAYOUT={2in1, TWO-SIDED} |
| | KEYWORD={LIVING ROOM 32, REMODELING, MEMBER} |
| | RELEVANT JOB ID={Prev=1000052, Next=NOTHING} |

FIG.25

2501
| |
|---|
| JOB ID=9510 |
| INPUT DATE/TIME=2006/11/10 15:25:50 |
| USER ID=07060 |
| SECURITY LEVEL=E |
| STORAGE PLACE=\\fileserver1\2006 |
| FILE NAME=BUDGET FOR FISCAL 2006 |
| TYPE OF FILE=WORDPROCESSOR DATA |
| PRINTER=32-IC-iR2500 |
| LAYOUT={2in1, TWO-SIDED} |
| KEYWORD={THESIS, TEST} |
| RELEVANT JOB ID={Prev=NOTHING, Next=NOTHING} |

2502
| |
|---|
| JOB ID=10885 |
| INPUT DATE/TIME=2006/11/18 19:18:45 |
| USER ID=06694 |
| SECURITY LEVEL=B |
| STORAGE PLACE=\\BOX89\078937\2006 |
| FILE NAME=ESTIMATION |
| TYPE OF FILE=SPREADSHEET DATA |
| PRINTER=33-2B-iRC3500 |
| LAYOUT={MONOCHROME, STAPLE} |
| KEYWORD={2006 FISCAL YEAR, BUDGET, EQUIPMENT COST} |
| RELEVANT JOB ID={Prev=NOTHING, Next=NOTHING} |

2503
| |
|---|
| JOB ID=11252 |
| INPUT DATE/TIME=2006/11/20 9:28:45 |
| USER ID=05582 |
| SECURITY LEVEL=B |
| STORAGE PLACE=http://xxx.yyy.jp/zzz/ |
| FILE NAME=DESIGN DRAWING FOR LIVING ROOM 32 |
| TYPE OF FILE=GRAPHIC DATA |
| PRINTER=32-OA-iRC3220 |
| LAYOUT={WEEKLY REPORT, PROGRESS} |
| KEYWORD={LIVING ROOM 32} |
| RELEVANT JOB ID={Prev=NOTHING, Next=NOTHING} |

2504
| |
|---|
| JOB ID=11698 |
| INPUT DATE/TIME=2006/11/25 10:58:25 |
| USER ID=03698 |
| SECURITY LEVEL=E |
| STORAGE PLACE=\\fileserver1\2006 |
| FILE NAME=BUDGET FOR FISCAL 2006 |
| TYPE OF FILE=WORDPROCESSOR DATA |
| PRINTER=32-1B-iR3600 |
| LAYOUT={2in1, TWO-SIDED} |
| KEYWORD={THESIS, TEST} |
| RELEVANT JOB ID={Prev=NOTHING, Next=NOTHING} |

2505
| |
|---|
| JOB ID=13456 |
| INPUT DATE/TIME=2006/12/1 18:31:15 |
| USER ID=08504 |
| SECURITY LEVEL=A |
| STORAGE PLACE=\\fileserver2\work\xxx |
| FILE NAME=ORDER DRAWING |
| TYPE OF FILE=GRAPHIC DATA |
| PRINTER=32-OA-iRC3220 |
| LAYOUT={NOTHING} |
| KEYWORD={2006 FISCAL YEAR, BUDGET, EQUIPMENT COST} |
| RELEVANT JOB ID={Prev=NOTHING, Next=NOTHING} |

2506
| |
|---|
| JOB ID=14445 |
| INPUT DATE/TIME=2006/12/2 15:31:15 |
| USER ID=05843 |
| SECURITY LEVEL=E |
| STORAGE PLACE=http://www.java.co.jp |
| FILE NAME=Opensource.html |
| TYPE OF FILE=HTML DATA |
| PRINTER=35-6H-iR4532 |
| LAYOUT={2in1, TWO-SIDED} |
| KEYWORD={java, OPEN SOURCE} |
| RELEVANT JOB ID={Prev=NOTHING, Next=NOTHING} |

2507
| |
|---|
| JOB ID=15858 |
| INPUT DATE/TIME=2006/12/3 11:31:8 |
| USER ID=03648 |
| SECURITY LEVEL=D |
| STORAGE PLACE=http://www.hoge.foo.com/xx |
| FILE NAME=index.html |
| TYPE OF FILE=HTML DATA |
| PRINTER=32-OA-iRC3220 |
| LAYOUT={BOOKBINDING} |
| KEYWORD={INTEGRATION, CPU, Linux} |
| RELEVANT JOB ID={Prev=NOTHING, Next=NOTHING} |

2508
| |
|---|
| JOB ID=16961 |
| INPUT DATE/TIME=2006/12/4 17:31:15 |
| USER ID=04752 |
| SECURITY LEVEL=D |
| STORAGE PLACE=\\fileserver4designe/flow |
| FILE NAME=LIVING ROOM REMODEL WORKER LIST |
| TYPE OF FILE=TEXT DATA |
| PRINTER=32-1B-iR3600 |
| LAYOUT={REDUCTION, MONOCHROME} |
| KEYWORD={2006 FISCAL YEAR, BUDGET, EQUIPMENT COST} |
| RELEVANT JOB ID={Prev=NOTHING, Next=NOTHING} |

INFORMATION PROCESSING APPARATUS, INFORMATION PROCESSING METHOD, AND COMPUTER PROGRAM CAPABLE OF PROVIDING USEFUL INFORMATION TO A USER BASED ON LOGS STORED IN A PRINTING SYSTEM AND IMPROVING THE USABILITY OF EACH USER WHO OPERATES A PRINTING SYSTEM

BACKGROUND OF THE INVENTION

1. Field of the Invention

The present invention relates to a printing system including an information processing apparatus, a method for controlling the information processing apparatus, and a computer program.

2. Description of the Related Art

A recent advanced printing system includes various office automation (OA) devices, such as personal computers and image forming apparatuses, which can communicate with each other via a network. In general, the printing system provides an environment allowing a plurality of users to commonly use an image forming apparatus.

If a print job is input to a printing system that performs printing, the printing system records various logs according to print results. For example, the printing system records detailed print setting information as well as fundamental information (e.g., user name, date/time, and file name of print data).

The usage of a recorded log is not limited to confirmation of a history of print processing. For example, a log is usable for re-inputting a print job and usable for accounting.

As discussed in Japanese Patent Application Laid-Open No. 2004-118243, to satisfy a requirement of enhancing the security, a printing system records a printed image which is appropriately reduced or compressed and, if an accident (leakage of information) occurs, traces the leaked information based on the recorded image.

As discussed in Japanese Patent Application Laid-Open No. 2006-159565, a printing system uses a log to restrict an operation of each user according to an environment. For example, a printing system can restrict the number of color printing sheets during a limited period of time.

The usage of a log in a conventional printing system is mostly limited to the trace of information or restriction of usable functions to improve the usability of an administrator who manages the printing system.

However, the above-described conventional printing systems do not utilize log(s) to improve the usability of each user who operates a printing system to execute print processing.

In general, the act is useful if many users conduct or follow in similar ways. For example, in an environment including two or more printing apparatuses connected to a network, users tend to operate a specific printing apparatus having highly advanced functions.

A log stored in a printing system is a history of user's behavior and can be used in a detailed analysis to check other user's act and intent in printing a document.

SUMMARY OF THE INVENTION

Exemplary embodiments of the present invention are directed to a printing system capable of providing useful information to a user based on logs stored in a printing system and improving the usability of each user who operates a printing system.

According to an aspect of the present invention, a printing system includes a storage unit adapted to store print logs relating to each of a plurality of print data that have been printed, the print log including relevant information relating to the print data, a reception unit adapted to receive relevant information relating to print data to be printed, a search unit adapted to find a print log including the relevant information received by the reception unit from the print logs stored in the storage unit, and a display unit adapted to display information indicating a print apparatus that has printed print data corresponding to the print log found by the search unit, which is extracted from the relevant information included in the print log found by the search unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 12 illustrates example logs according to an exemplary embodiment of the present invention.

FIG. 25 illustrates example logs stored in the data storage according to an exemplary embodiment of the present invention.

DETAILED DESCRIPTION OF THE EMBODIMENTS

Figure 1:
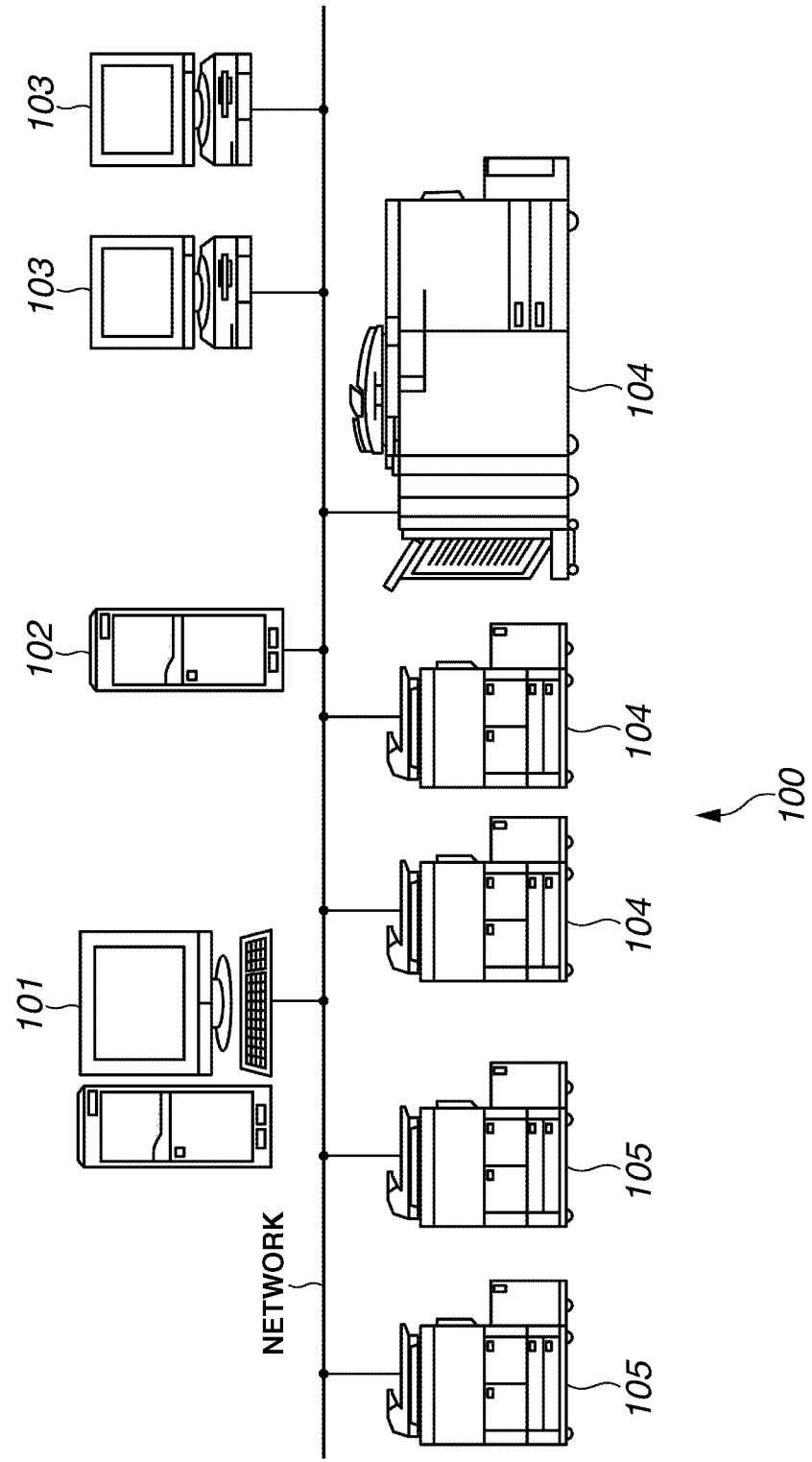
FIG. 1 illustrates a printing system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 illustrates a printing system according to an exemplary embodiment of the present invention.

A print server 101, a data storage 102, two client personal computers (PCs) 103, three color multifunction peripherals (MFPs) 104, and two monochrome multifunction peripherals (MFPs) 105 can communicate with each other via a local area network (LAN), a wide area network (WAN), Internet, or a wireless network.

The print server 101, the data storage 102, and the client PCs 103 are information processing apparatuses (e.g., personal computers and workstations).

The print server 101 receives print jobs from the client PCs 103 and the MFPs 104 and 105. The print server 101 transmits print information of a received print job to a designated printing apparatus. The printing apparatus is any type of image forming apparatus having a print function, such as color MFP 104 or monochrome MFP 105 illustrated in FIG. 1 or a Single Function Peripheral (SFP) not illustrated. According to an exemplary embodiment of the present invention, the print server 101 analyzes logs stored in the data storage 102 and transmits later-described recommendable information to the client PC 103 or the MFP 104 (or 105).

The data storage 102 stores logs generated by the print server 101. The log is information recording a print job having been previously print processed and is information identifying a print object file.

The client PC 103 generates a print job and instructs the print server 101 to execute print processing. The client PC 103 can monitor and control as an auxiliary the devices and jobs managed in the print server 101.

The color MFPs 104 and the monochrome MFPs 105 are image forming apparatuses having various functions (e.g., scan, print, and copy functions). A user can select a desired MFP according to a requested print job because the color MFPs 104 and the monochrome MFPs 105 are different in processing speed and cost.

The printing system according to an exemplary embodiment of the present invention is a mere example and can be modified in various ways. For example, the print server 101 may include functions of the data storage 102. The image forming apparatus (e.g., color MFP 104 or monochrome MFP 105) or the client PC 103 may include functions of the print server 101.

According to an exemplary embodiment, a print job is transmitted to a printing apparatus via the print server 101. However, the client PC 103 can directly transmit a print job to a printing apparatus. In this case, the print server 101 (as a dedicated server) analyzes logs stored in the data storage 102 and sends later-described recommendable information to the client PC 103 or the MFP 104 (105).

Figure 2:
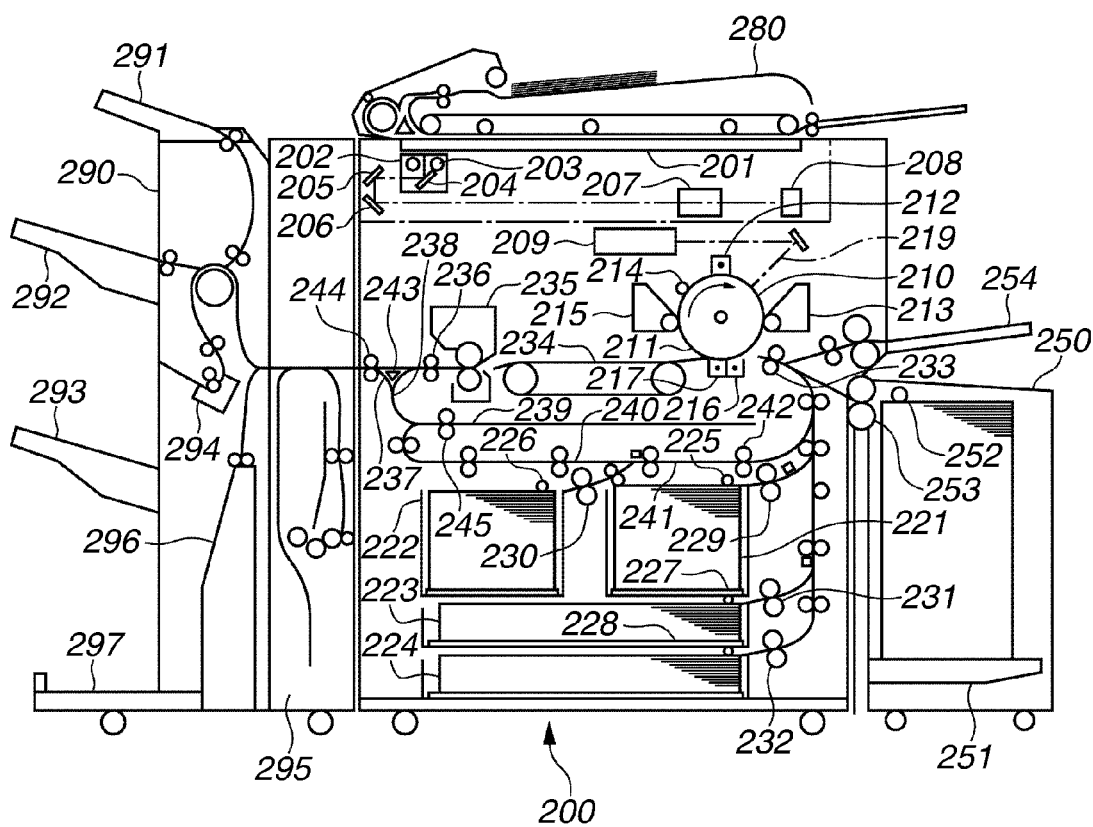
FIG. 2 is a cross-sectional diagram illustrating a multifunction peripheral (MFP) according to an exemplary embodiment of the present invention.

FIG. 2 illustrates a cross-sectional view of the MFP 104 that includes a main body 200, an auto document feeder (ADF) 280, a platen glass (i.e., document positioning glass plate) 201, a scanner 202, a scanning mirror 204, and an illumination lamp 203. The scanner 202 can move in a predetermined back-and-force direction. Reflection light passes through scanning mirrors 204 to 206 and a lens 207 and forms an image on a charge coupled device (CCD) sensor provided in an image sensor unit 208.

An exposure control unit 209, including a laser and a polygonal scanner, emits a laser beam 219 modulated based on an image signal (i.e., an electric signal converted by the image sensor unit 208 and subjected to later-described predetermined image processing) toward a photosensitive drum 211.

A primary charging unit 212, a developing unit 213, a transfer charging unit 216, a pre-exposure lamp 214, and a cleaning unit 215 are disposed around the photosensitive drum 211. In an image forming unit 210, a motor (not illustrated) rotates the photosensitive drum 211 in a predetermined direction (indicated by an arrow). The primary charging unit 212 charges the photosensitive drum 211 to have a desired electric potential.

The exposure control unit 209 emits the laser beam 219 onto the photosensitive drum 211 to form an electrostatic latent image. The developing unit 213 develops the electrostatic latent image formed on the photosensitive drum 211 so that the electrostatic latent image can be visualized as a toner image.

Pickup rollers 225, 226, 227, and 228 successively feed recording papers from a right cassette deck 221, a left cassette deck 222, an upper-deck cassette 223, or a lower-deck cassette 224. Paper-feeding rollers 229, 230, 231, and 232 convey recording papers to the main body 200. A pair of resist rollers 233 sends a recording paper to a transfer belt 234. The transfer charging unit 216 transfers the visualized toner image onto a recording paper.

The cleaning unit 215 removes (collects) the toner remaining on the photosensitive drum 211 after the toner image is transferred onto a recording paper. The pre-exposure lamp 214 erases residual electric charge on the photosensitive drum 211. A separation charging unit 217 separates the recording paper from the photosensitive drum 211. The transfer belt 234 conveys the recording paper to a fixing unit 235. The fixing unit 235 fixes the toner image on the recording paper under applied heat and pressure. A pair of paper-discharge rollers 236 discharges a recording paper out of the main body 200.

The main body 200 includes a deck 250 having a storage capacity, for example, of 4000 recording papers. The deck 250 includes a lifter 251 that can move upward according to an amount of stored recording papers, so that a topmost recording paper constantly contacts a pickup roller 252. A pair of paper-feeding rollers 253 feeds a recording paper into the main body 200. The main body 200 includes a multi-manual feed tray 254 having a storage capacity of 100 recording papers.

In FIG. 2, a paper-discharge flapper 237 switches the paper-conveyance path between a conveyance path 238 and a discharge path 243. A reversing path 239 reverses a recording paper fed by the paper-discharge rollers 236. A lower conveyance path 240 guides the reversed recording paper to a paper re-feeding path 241.

A pair of paper-feeding rollers 230 guides a recording paper from the left cassette deck 222 to the paper re-feeding path 241. A pair of paper re-feeding rollers 242 re-feeds a recording paper to the image forming unit 210. A pair of discharge rollers 244, disposed in the vicinity of the paper-discharge flapper 237, discharges a recording paper out of the main body 200 when the paper-discharge flapper 237 guides the recording paper toward the discharge path 243.

In a two-sided recording (two-sided copy) operation, the paper-discharge flapper 237 moves upward and guides a copy-processed recording paper to the paper re-feeding path 241 via the conveyance path 238, the reversing path 239, and the lower conveyance path 240. In this case, a pair of reversing rollers 245 pulls a recording paper sandwiched there between toward the reversing path 239 so that a recording paper (including its trailing edge) can be wholly extracted from the conveyance path 238. Then, the reversing rollers 245 rotate in the opposite directions to send the recording paper to the conveyance path 240.

When a reversed recording paper is discharged from the main body 200, the paper-discharge flapper 237 moves upward and the reversing rollers 245 stop a recording paper moving toward the reversing path 239 at an intermediate position so that a trailing edge of the paper remains on the conveyance path 238. Then, the reversing rollers 245 rotate in the opposite directions to send the reversed recording paper to the discharge rollers 244.

A paper discharge processing apparatus 290 has a function of aligning and binding recording papers discharged from the main body 200. A processing tray 294 receives recording papers successively discharged from the main body 200. If a predetermined amount of image forming operation is completed, a bundle of recording papers is stapled (or stitched) and output to a paper discharge tray 292 or 293.

A motor (not illustrated) moves the paper discharge tray 293 in the up-and-down direction. Prior to commencement of an image forming operation, the paper discharge tray 293 is positioned at a height corresponding to the processing tray 294. Then, the position of the paper discharge tray 293 is gradually lowered so that the topmost discharged recording paper can be constantly positioned at the height corresponding to the processing tray 294.

Furthermore, a tray lower-limit sensor (not illustrated) detects a lower-limit position of the paper discharge tray 293. The paper discharge tray 293 reaches the lower-limit position when the paper discharge tray 293 stores approximately 2000 recording papers. A paper tray 291 stores break papers (e.g., index sheets) to be inserted between discharged recording papers. A Z-folding machine 295 folds the discharged recording papers in a Z-shape.

A bookbinding machine 296 folds each part of discharged recording papers at their centers and staples (or stitches) the papers into a book shape. The bookbinding-processed papers (i.e., bundle of bound papers) are discharged to a discharge tray 297. According to the example illustrated in FIG. 2, the image forming processing is an electrophotographic type. However, the image forming processing may be an inkjet type or any other type.

Figure 3:
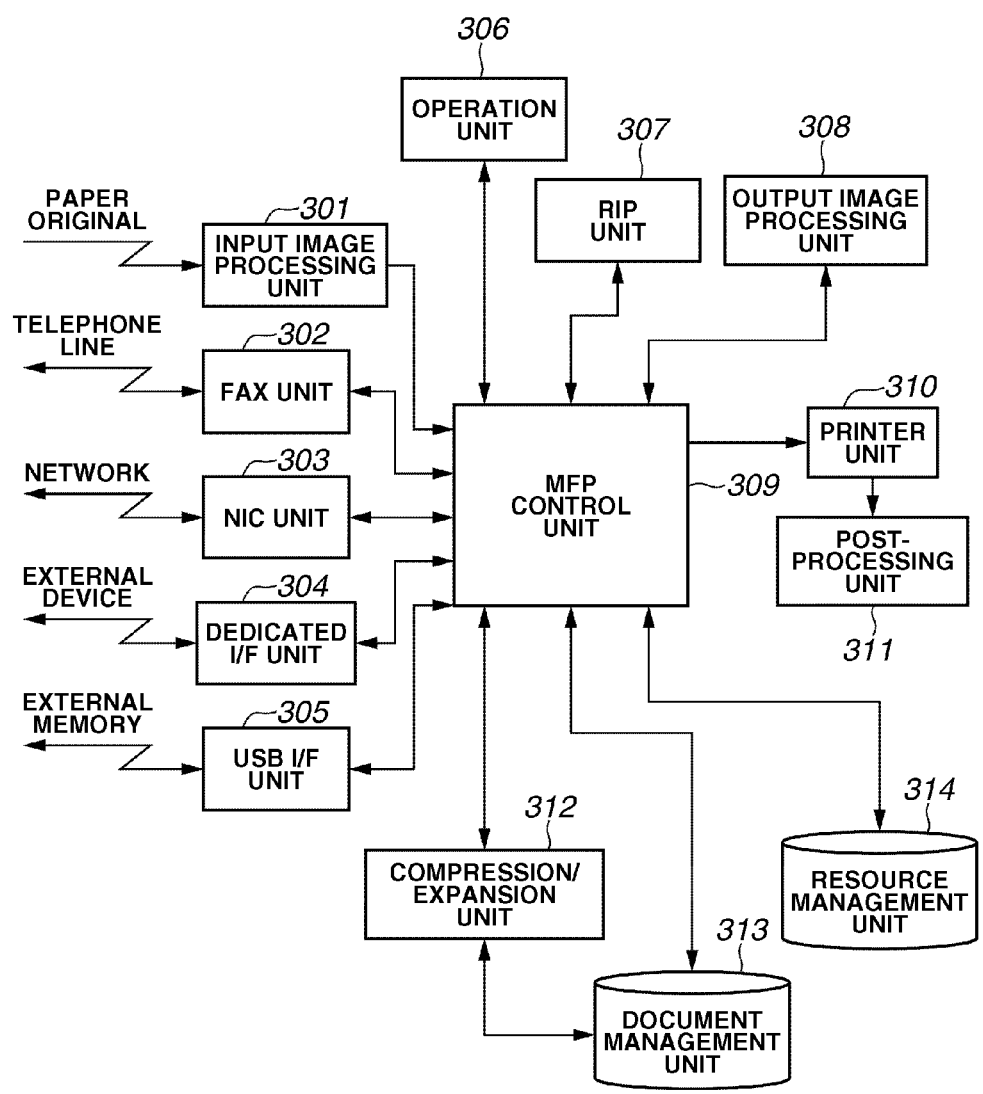
FIG. 3 is a block diagram illustrating a hardware configuration of the MFP according to an exemplary embodiment of the present invention.

FIG. 3 illustrates an exemplary configuration of a multi-function peripheral (MFP).

The MFP includes a built-in memory (e.g., a hard disk) which can store data of a plurality of jobs. The MFP is an image forming apparatus having a copy function for causing a printer unit to print image data acquired by a scanner via the memory. Furthermore, the MFP has a print function for causing the printer unit to process print data output from an external apparatus (e.g., a computer).

The MFP is a full-color type or a monochrome type, although both full-color devices and monochrome devices are fundamentally similar in configuration except for color image processing and processed data. The following exemplary embodiments are described based on a full-color device and, if necessary, may include an explanation for a monochrome device.

An image forming apparatus according to an exemplary embodiment of the present invention is a multi-functional image forming apparatus that is capable of performing a plurality of functions or a unifunctional image forming apparatus capable of performing a single print function.

In FIG. 3, an input image processing unit 301 reads an image of an original (i.e., a paper document) and performs image processing on the read image data. A facsimile (FAX) unit 302 performs transmission/reception of images via a telephone line. A network interface card (NIC) unit 303 performs transmission/reception of image data and apparatus information via a network.

A dedicated interface unit 304 communicates with an external apparatus to exchange image data or other information. A Universal Serial Bus interface (USB I/F) unit 305 transmits/receives image data to/from a USB memory (i.e., a removable media) or a USB device. An MFP control unit 309 can temporarily store image data according to an application installed on the MFP or can determine a route of the image data.

A document management unit 313 includes a memory (e.g. hard disk) which can store various image data. For example, a control unit of the image forming apparatus (CPU of the MFP control unit 309) stores image data input via the input image processing unit 301, the NIC unit 303, the dedicated I/F unit 304, and the USB I/F unit 305 into the hard disk.

The document management unit 313 manages two or more storage areas of a hard disk which are partitioned for each job type or each user. Each of two or more storage areas is referred to as "box." The box is, for example, a user box, a system box, or a FAX box differentiated according to the type of a stored job. A box number (e.g., 1st, 2nd, . . . , 99th) is allocated to each user box so that the access right of each user can be managed.

Furthermore, the document management unit 313 reads necessary image data from the hard disk, transfers the read data to a printer unit 310 (i.e., an output unit), and controls the printer unit 310 that performs print processing.

Furthermore, in response to an instruction from an operator, the document management unit 313 transfers the image data read out of the hard disk to an external apparatus (e.g., a computer or other image forming apparatus).

The compression/expansion unit 312 compresses image data, if necessary, when the image data is stored in the document management unit 313. The compression/expansion unit 312 expands (decompresses) image data into the original image data in the process of reading the compressed image data out of the document management unit 313. The data transmitted via a network include compression data (e.g., Joint Photographic Experts Group (JPEG), Joint Bi-level Image Experts Group (JBIG), and ZIP). Therefore, the compression/expansion unit 312 expands (decompresses) input data if the MFP receives compressed data.

Furthermore, a resource management unit 314 stores various parameter tables (e.g., font, color profile, and gamma tables) which can be commonly used and, if necessary, invokes a necessary table. The resource management unit 314 can store new parameter tables and correct (update) the stored tables.

The MFP control unit 309 controls a Raster Image Processor (RIP) unit 307 that performs Raster Image Processor processing on PDL data and, if necessary, controls an output image processing unit 308 that performs image processing for a print image to be printed. Furthermore, the MFP control unit 309 can control the document management unit 313 to store intermediate data or print ready data (i.e., bitmap data for a print or compressed data thereof) of the generated image data, if necessary.

The image processed print data is sent to the printer unit 310 that performs image formation processing. The printed sheets output from the printer unit 310 are sent to a post-processing unit 311 that performs processing for sorting and/or finishing the sheets.

The MFP control unit 309 has a role of smoothly processing a job and can switch a job flow path according to a usage of the MFP. Although it is generally known that image data can be stored as intermediate data if necessary, the following examples do not express any access except that the document management unit 313 is a start point or an end point. Furthermore, to simply express respective job flows, the following examples do not include the processing of the compression/expansion unit 312, the post-processing unit 311, and the MFP control unit 309.

Example job flows are as follows.
A) Copy function: input image processing unit 301→output image processing unit 308→printer unit 310
B) FAX transmission function: input image processing unit 301→FAX unit 302
C) FAX reception function: FAX unit 302→output image processing unit 308→printer unit 310
D) Network scan: input image processing unit 301→NIC unit 303
E) Network print: NIC unit 303→RIP unit 307→output image processing unit 308→printer unit 310
F) Scan to external apparatus: input image processing unit 301→dedicated I/F unit 304
G) Print from external apparatus: dedicated I/F unit 304→output image processing unit 308→printer unit 310
H) Scan to external memory: input image processing unit 301→USB I/F unit 305
I) Print from external memory: USB I/F unit 305→RIP unit 307→output image processing unit 308→printer unit 310
J) Box scan function: input image processing unit 301→output image processing unit 308→document management unit 313
K) Box print function: document management unit 313→printer unit 310
L) Box reception function: NIC unit 303→RIP unit 307→output image processing unit 308→document management unit 313
M) Box transmission function: document management unit 313→NIC unit 303
N) Preview function: document management unit 313→operation unit 107

Other example job flows may include various functions (e.g., E-mail service and Web server functions) which are adequately combined.

The box scan function, the box print function, the box reception function, and the box transmission function are processing functions of the MFP that performs writing/reading of data using the document management unit 313. More specifically, the MFP writes/reads a file or image data into/from a box in the document management unit 313 for each job or each user, and prints the read image data.

An operation unit 306 enables a user to select one of the above-described various job flows and functions and instruct various operations. The operation unit 306 includes a display unit having a higher resolution and capable of displaying a preview image of image data stored in the document management unit 313 and allowing a user to confirm the image before starting a print operation.

Figure 4:
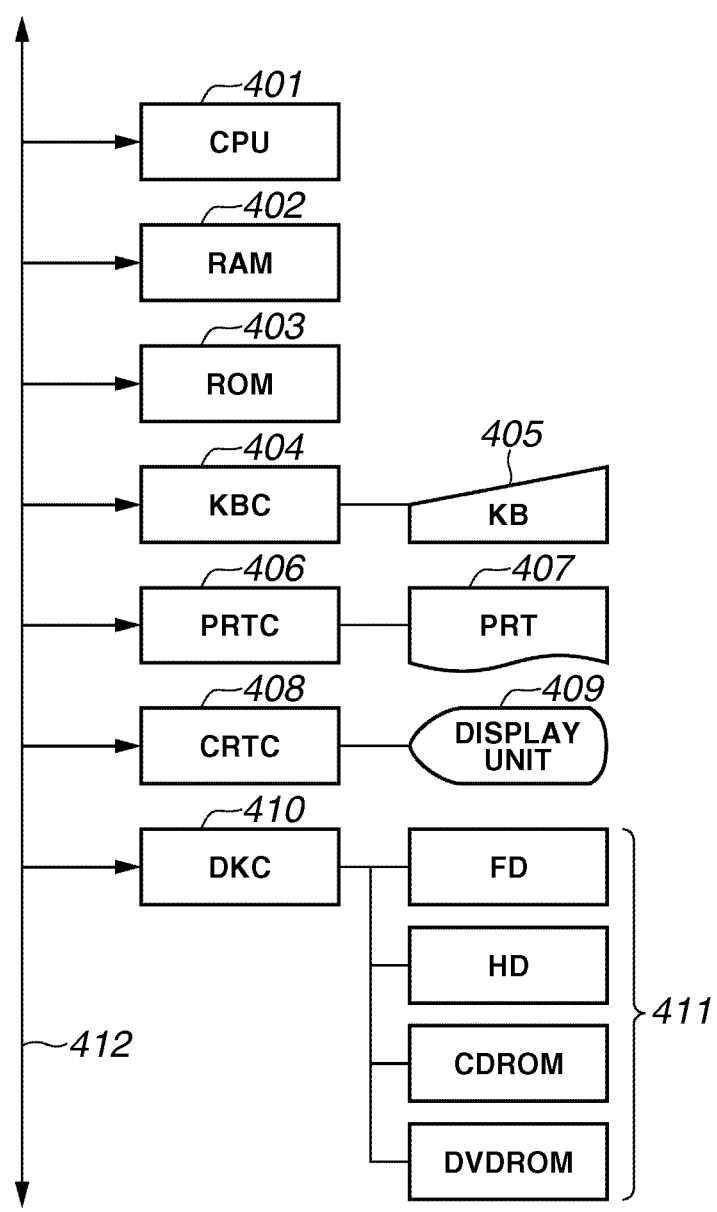
FIG. 4 is a hardware block diagram of a print server, a data storage, or a client PC according to an exemplary embodiment of the present invention.

FIG. 4 is a block diagram illustrating a fundamental configuration of an information processing apparatus (e.g., print server 101, data storage 102, or client PC 103) according to an exemplary embodiment.

In FIG. 4, a central processing unit (CPU) 401 executes control and calculation processing according to a program loaded from a random access memory (RAM) 402. The RAM 402 provides a work area into which a program and data can be loaded for each processing and executed. A read only memory (ROM) 403 stores a system control program and font data. A keyboard control unit (KBC) 404 receives data entered via a keyboard (KB) 405 and transmits the received data to the CPU 401. A printer control unit (PRTC) 406 controls a printer (PRT) 407. The printer 407 is, for example, a multifunction peripheral (MFP), a laser beam printer, or an inkjet printer.

A display control unit 408 controls a display unit 409. A disk control unit (DKC) 410 controls transmission of data. An external storage device 411 is, for example, a floppy disk (FD), a hard disk (HD), a compact disk (CDROM), or a digital versatile disk (DVDROM). The external storage device 411 stores programs and data. The program stored in the external storage device 411 can be referred to or loaded into the RAM 402, if necessary, when the CPU 401 executes this program. The data transfer between the above-described units can be performed via a system bus 412.

The information processing apparatus performs operations when the CPU 401 executes a basic input/output (I/O) program and an operating system (OS). The external storage device 411 or the ROM 403 of the print server 101 or the client PC 103 stores programs of later-described flowcharts that the CPU 401 can execute.

The ROM 403 stores the basic I/O program and the HD 411 stores the OS. The basic I/O program includes an initial program loading (IPL) function for loading the OS from the HD 411 into the RAM 402 to automatically start the operation of the OS in response to a turning-on operation of a user terminal (i.e., information processing apparatus).

Figure 5:
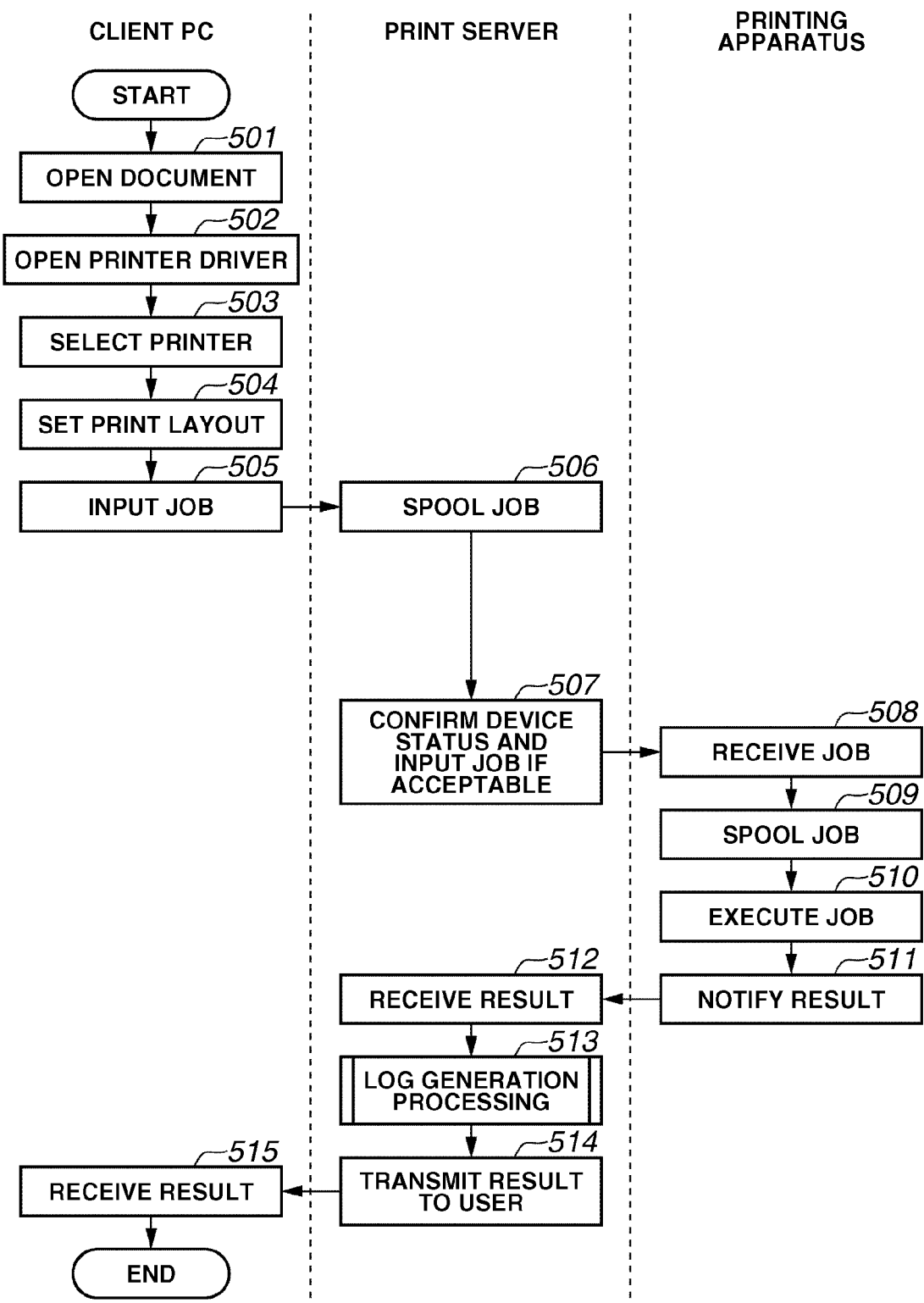
FIG. 5 is a flowchart illustrating example print processing using the client PC according to an exemplary embodiment of the present invention.

FIG. 5 illustrates an exemplary processing procedure, according to which a print job is received from the client PC 103 and processed by a printing apparatus via a printer server.

At step 501, the client PC 103 opens a file (i.e., an object to be printed). More specifically, predetermined application software operating on the client PC 103 opens a file. The file is, for example, a document file, an image file, or a Portable Document Format (PDF) file.

At step 502, the client PC 103 executes a printer driver in response to a user's instruction. If the printer driver is activated in step 502, the display unit 409 of the client PC 103 displays an example screen illustrated in FIG. 6.

Figure 6:
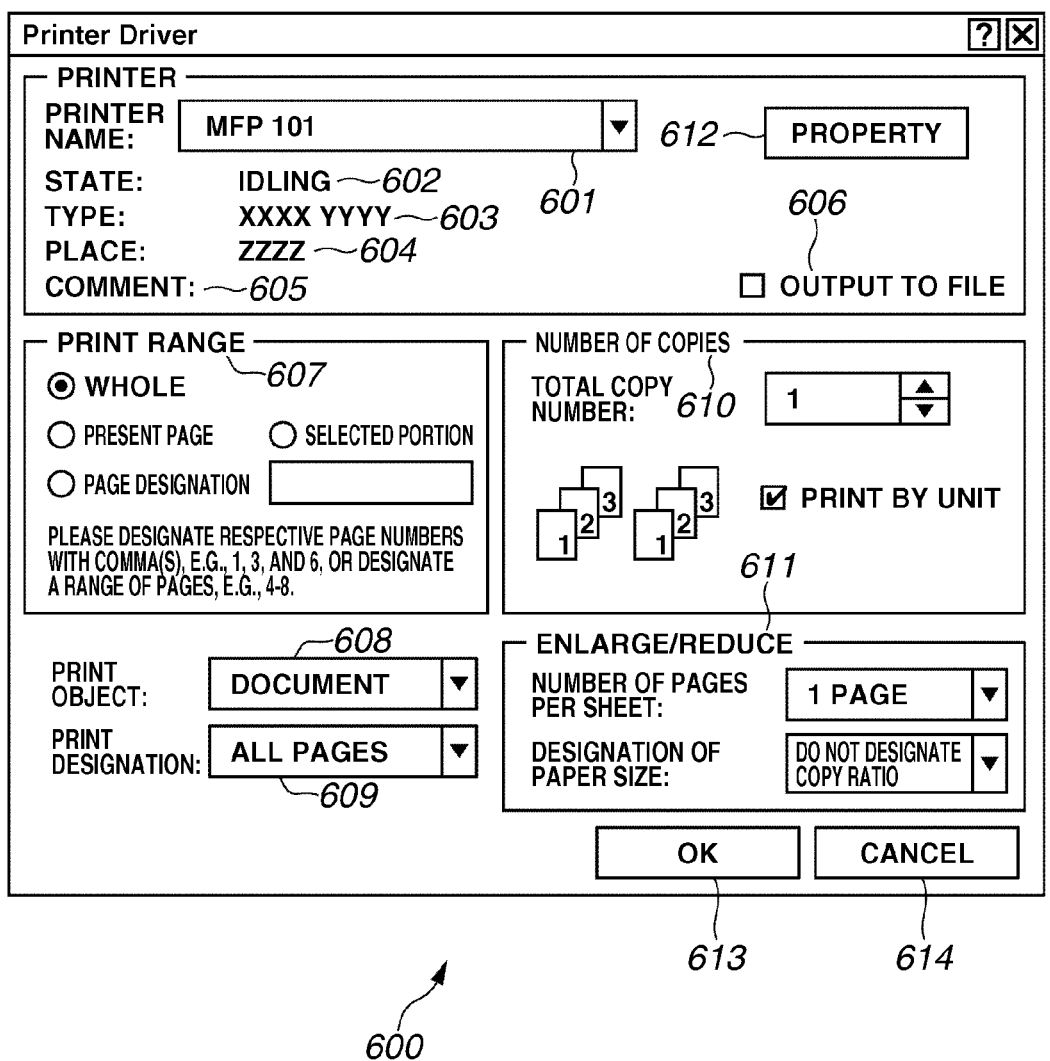
FIG. 6 illustrates a printer driver operation screen according to an exemplary embodiment of the present invention.

FIG. 6 illustrates an example printer driver operation screen.

A printer driver setting screen 600 is a screen displayed when an operator transmits print data to a printing apparatus (e.g., MFP). In general, an operator can select this screen from a print menu of a print application.

A "PRINTER NAME" pull-down list box 601 enables an operator to select a printing apparatus to be used. If an operator selects a desired printing apparatus, a "STATE" field 602 displays a state of the selected printing apparatus, a "TYPE" field 603 displays a type of the selected printer driver, a "PLACE" field 604 displays a setup location of the selected printing apparatus, and a "COMMENT" field 605 displays a comment from an administrator of the selected printing apparatus.

An "OUTPUT TO FILE" check box 606 enables an operator to output print data to a file without performing printing in a printing apparatus. A "PRINT RANGE" field 607 includes radio buttons of "WHOLE", "PRESENT PAGE", "SELECTED PORTION", and "PAGE DESIGNATION" which can be selected by an operator to designate a desirable print range.

If an operator selects the "PAGE DESIGNATION" radio button, the operator can input page number(s) in an edit box. A "PRINT OBJECT" pull-down list box 608 enables an operator to select an attribute of a document (i.e., a print object). A "PRINT DESIGNATION" pull-down list box 609 enables an operator to designate printing of all pages or printing of odd (or even) page(s). A "NUMBER OF COPIES" field 610 includes a "TOTAL COPY NUMBER" spin box that enables an operator to input a desired number of copies. The "NUMBER OF COPIES" field 610 includes a "PRINT BY UNIT" check box that enables an operator to print a plurality of pages by unit.

An "ENLARGE/REDUCE" field 611 includes a "NUMBER OF PAGES PER SHEET" pull-down list box that enables an operator to designate an N-up printing (i.e., a print layout of two or more pages on a printing surface). The "ENLARGE/REDUCE" field 611 includes a "DESIGNATION OF PAPER SIZE" pull-down list box that enables an operator to select a desirable paper size relative to the size of an original.

At step 503, the printer driver selects a printing apparatus (i.e., a sending destination of the print job). More specifically, a user selects a desired printing apparatus via the "PRINTER NAME" pull-down list box 601 illustrated in FIG. 6. The printer driver designates a printing apparatus selected by a user as sending destination of a print job.

At step 504, the printer driver determines print settings of a file (i.e., print object). More specifically, if a user clicks on a "PROPERTY" button 612 illustrated in FIG. 6, the printer driver causes the client PC 103 to display a print setting screen illustrated in FIG. 7. The print setting screen illustrated in FIG. 7 enables a user to select a desired print layout.

The print layout includes settings of output sheet size, printing orientation, selection between color or monochrome, two-sided printing or one-sided printing, and execution of post-processing (e.g., staple processing). If a user selects a print layout from the screen illustrated in FIG. 7 and clicks on an "OK" button 716, the printer driver determines the settings selected by a user as finalized print layout. The print setting screen illustrated in FIG. 7 includes the following setting items.

A "FAVORITE" pull-down list box 701 enables a user to select an optimum page setting among predetermined page setting modes. Two buttons positioned at the left side enable a user to add and edit a favorite selection item.

If a user clicks on a "SETTING CONFIRMATION" button 702, the setting contents on the print setting screen can be displayed as a list. A page image 703, displayed above the "SETTING CONFIRMATION" button 702, reflects the print setting contents having been set.

An "OUTPUT METHOD" pull-down list box 704 enables a user to select a desirable output method. More specifically, the user can designate ordinary printing or secure printing performed by the printing apparatus (e.g., MFP). Furthermore, the user can determine whether to store print data in a hard disk of the printing apparatus, and whether to execute editing and preview on the printing apparatus.

An "ORIGINAL SIZE" pull-down list box 705 enables a user to select the size of an original (i.e., print object). An "OUTPUT SHEET SIZE" pull-down list box enables a user to select the size of an output paper of a printing apparatus. A "NUMBER OF COPIES" spin box 706 enables a user to input a desirable number of copies.

An "ORIENTATION OF PRINT" radio button 707 enables a user to select an orientation of a printing paper output from a printing apparatus between "PORTRAIT" and "LANDSCAPE." A "PAGE LAYOUT" pull-down list box 708 enables a user to set N-up printing. If a "DESIGNATE MAGNIFICATION" check box 709 is in a selected state, a user can input a desirable enlargement/reduction value (%) in a "MAGNIFICATION" spin box 710.

If a "STAMP" check box 711 is in a selected state, a user can select a desirable type of stamp displayed in a pull-down list box. A "STAMP EDITING" button 712 enables a user to add a type of stamp and edit the stamp. A "USER-DEFINED PAPER" button 713 enables a user to define a user-defined paper. A "PAGE OPTION" button 714 enables a user to set page options in more details. A "RESTORE DEFAULT" button 715 enables a user to restore default setting values.

If a user clicks on an "OK" button 816 after completing print settings of the printer driver, the print attributes can be reflected to actual printing. A "CANCEL" button 717 enables a user to cancel settings on the print setting screen. A "HELP" button 718 enables a user to display a help screen with respect to print settings.

If a user clicks on an "OK" button 613 of the screen illustrated in FIG. 6 after completing selection of a printing apparatus and determination of a print layout, at step 505, the client PC 103 transmits a print job to the print server 101.

At step 506, the print server 101 receives a print job from the client PC 103 and spools the received job on a spooler.

At step 507, the print server 101 refers to the received print job and identifies a designated printing apparatus. Then, the print server 101 interrogates the identified printing apparatus about a present status. If the printing apparatus can accept an entry of a new job, the print server 101 transmits a print job to the printing apparatus. If the printing apparatus cannot accept an entry of a print job, the print server 101 maintains a spool state.

At step 508, the printing apparatus receives the print job transmitted from the print server 101.

At step 509, the printing apparatus spools the received print job on its spooler until the printing apparatus can start print processing of this job.

At step 510, the printing apparatus executes the print job. At step 511, the printing apparatus transmits a print result to the print server 101.

At step 512, the print server 101 receives the print result transmitted from the printing apparatus.

At step 513, the print server 101 executes log generation processing.

At step 514, the print server 101 transmits the print result received from the printing apparatus to the client PC 103.

At step 515, the client PC 103 receives the print result from the print server 101 and terminates the processing of this routine.

Figure 8:
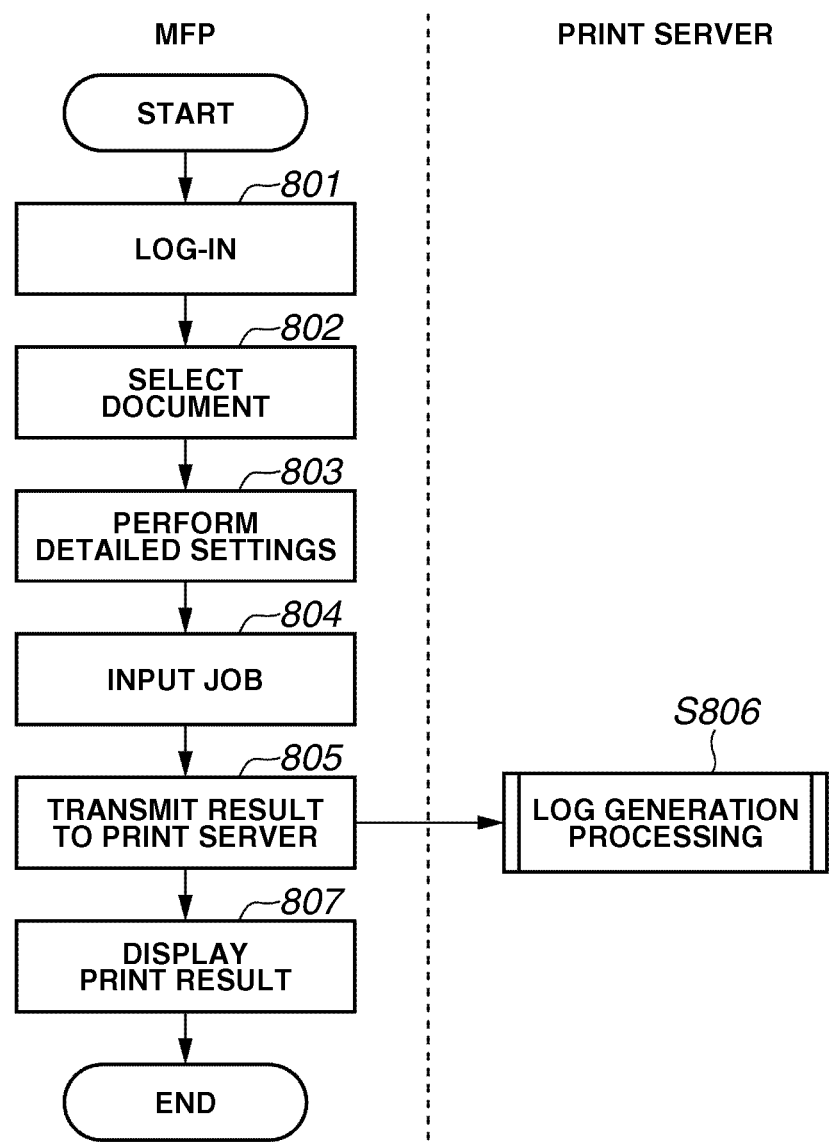
FIG. 8 a flowchart illustrating example print processing using the MFP according to an exemplary embodiment of the present invention.

FIG. 8 illustrates example print processing for a file stored in a box of the MFP.

At step 801, the MFP accepts a log-in request from a user. At step 802, the MFP selects a print object file from a box thereof. More specifically, the MFP selects a file according to instructions entered by a user via screens illustrated in FIGS. 9 and 10.

Figure 9:
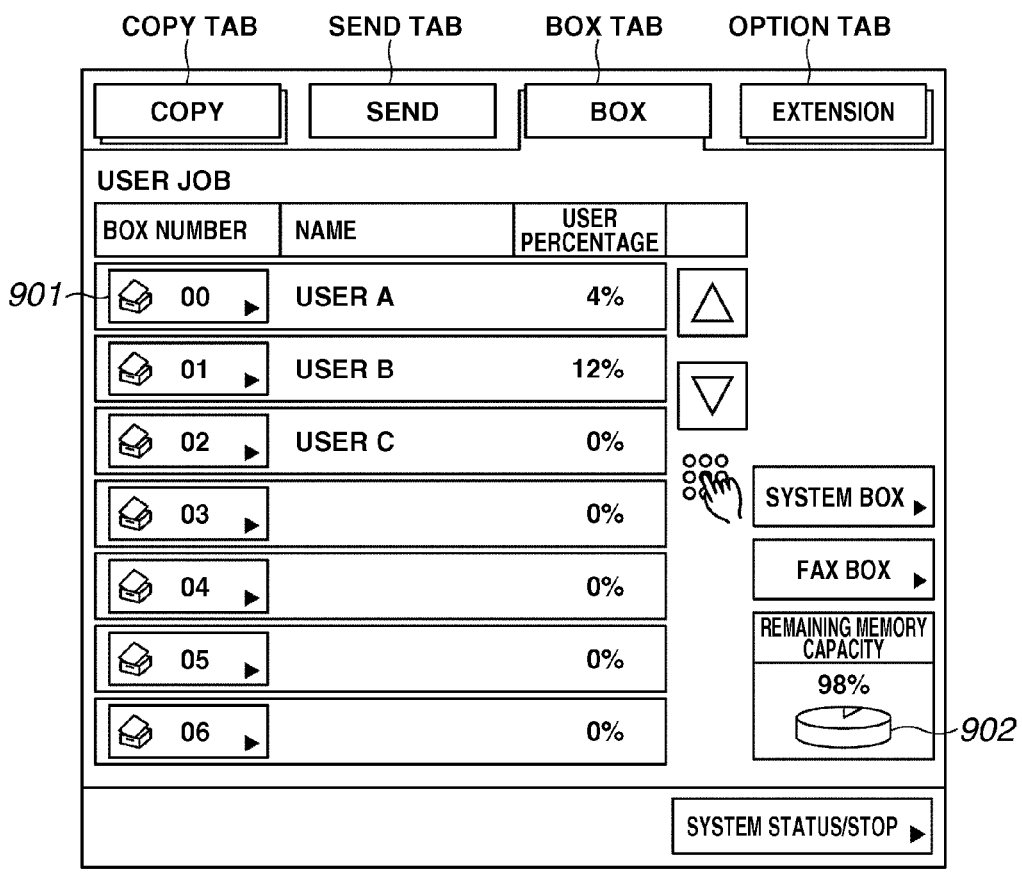
FIG. 9 illustrates an MFP operation screen according to an exemplary embodiment of the present invention.
Figure 10:
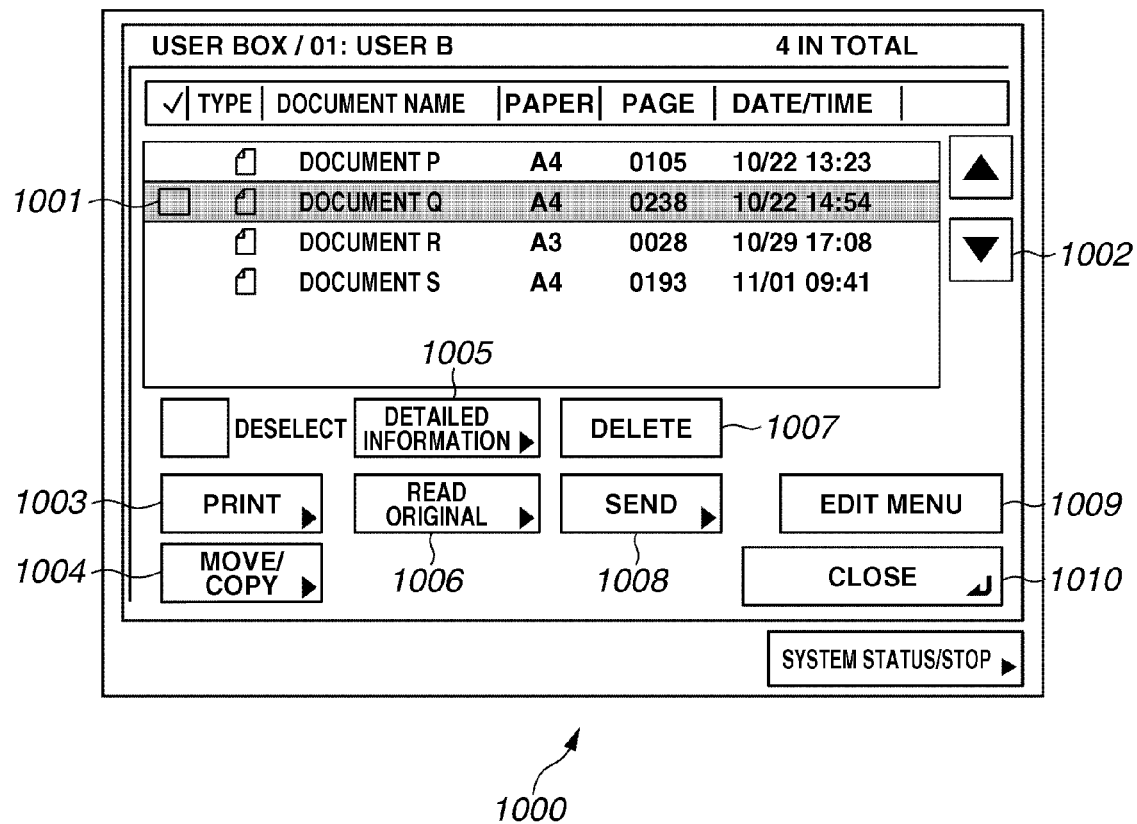
FIG. 10 illustrates an MFP operation screen according to an exemplary embodiment of the present invention.

FIG. 9 illustrates an example box selection screen (900) displayed on a touch panel of the operation unit 306 of the MFP. If a user clicks on any one of box numbers 901 on the screen illustrated in FIG. 9, files stored in the selected box can be displayed as illustrated in FIG. 10. In FIG. 9, a free space 902 indicates an area allocated to a box in a hard disk of the MFP.

In an exemplary embodiment, boxes may be present in a storage device accessible via a network or a hard disk of another MFP connected via a network. In this case, the screens illustrated in FIGS. 9 and 10 display box information of other MFP.

The screen illustrated in FIG. 10 includes a document list 1001 indicating files stored in the box and an arrow key 1002 that enables a user to select a print object file from the document list 1001. A user can also select a print object file by touching a desired document name on a touch panel. A "PRINT" button 1003 enables a user to instruct a print of a file selected from the document list 1001.

A "MOVE/COPY" button 1004 enables a user to move or copy a file selected from the document list 1101. A "DETAILED INFORMATION" button 1005 enables a user to display detailed information of a document selected from the document list 1001. A "READ ORIGINAL" button 1006 enables a user to scan a paper original with the scanner 202 and store acquired data in a box.

A "DELETE" button 1007 enables a user to delete a document selected from the document list 1001. A "SEND" button 1008 enables a user to transmit a document selected from the document list 1001, for example, as an attached file of an electronic mail. An "EDIT MENU" button 1009 enables a user to edit attributes of a selected document (i.e., a highlighted document in the document list 1001). A "CLOSE" button 1010 enables a user to terminate a box operation.

If a user selects a print object file and inputs print settings via the screens illustrated in FIGS. 9 and 10, the processing flow proceeds to step 804.

At step 804, the MFP transmits print data to the printer unit 310 if a user clicks on the "PRINT" button 1003.

If the printer unit 310 completes the print processing, the processing flow proceeds to step 805. At step 805, the MFP transmits a print result to the print server 101.

At step 806, the print server 101 executes log generation processing based on the print result received from the MFP.

At step 807, the MFP displays the print result on the touch panel and terminates the processing of this routine.

The print server 101 generates a log of a print job in the following manner. According to an exemplary embodiment, if the printing apparatus completes print processing, the print server 101 generates a log relating to the print job. Then, the print server 101 transmits the generated log to the data storage 102 and manages the log.

Figure 11:
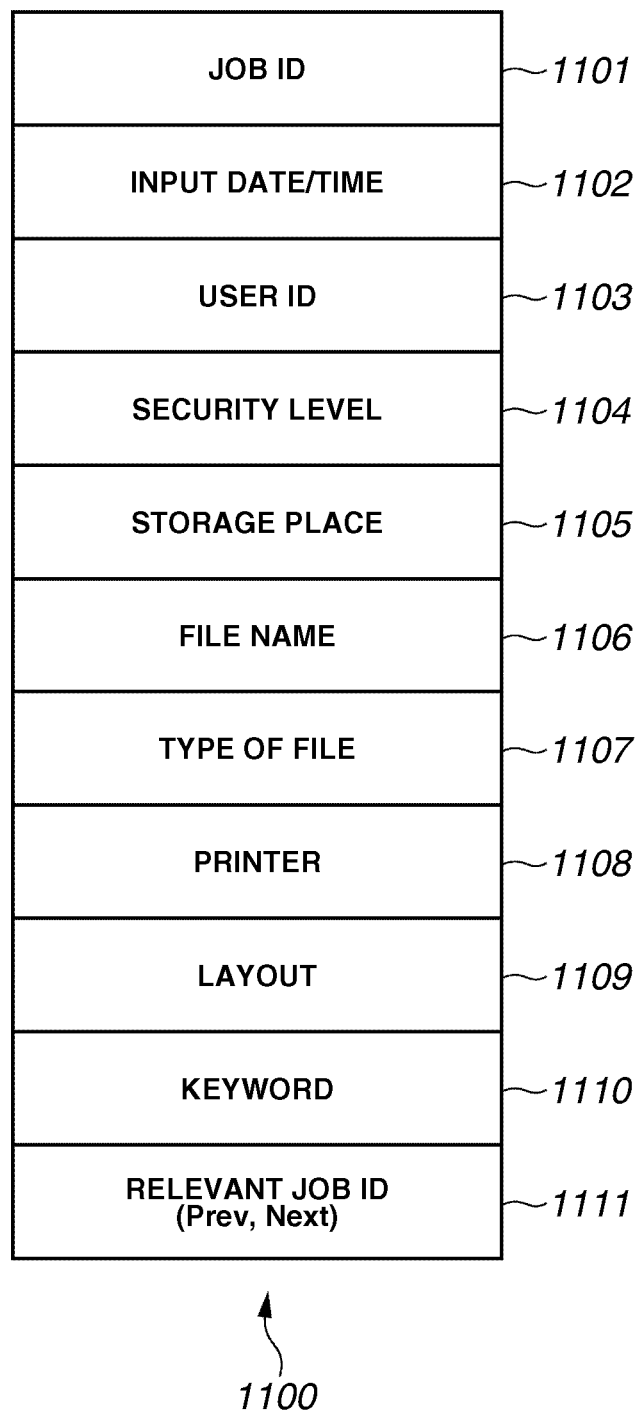
FIG. 11 illustrates an example log according to an exemplary embodiment of the present invention.

FIG. 11 illustrates an example format of a log generated by the print server 101.

As illustrated in FIG. 11, a log 1100 generated by the print server 101 includes eleven items 1101 through 1111.

The items are roughly classified into two groups, i.e., items acquired from an apparatus (e.g., client PC 103 or the MFP) which requests print processing and items generated from the print server 101.

The items acquired from an apparatus that requests print processing include user ID 1103, storage place 1105, file name 1106, type of file 1107, output destination printer 1108, and layout 1109. The items generated from the print server 101 include job ID 1101, job input date/time 1102, security level 1104, keyword 1110, and relevant job ID 1111.

The user ID 1103 is identification information capable of identifying a user who performs print processing. For example, a user inputs a user ID in a log-in process of the client PC 103 if the user operates the client PC 103 that processes a print request. Similarly, a user inputs a user ID in a log-in process of the MFP if the user operates the MFP that performs print processing. The user ID 1103 is, for example, numerical data or a character string that can identify a user.

The storage place 1105 indicates a place where a print object file is stored. For example, the storage place 1105 is path information of a storage area if a print object file is stored in a predetermined storage area of the client PC 103. For example, if a web page on Internet is a print object, the storage place 1105 is URL of the web page (web site).

The file name 1106 is a file name of a print object file. The type of file 1107 is a format of a print object file. For example, an extension of file name indicates a type of file that can be identified by the print server 101. The type of file is, for example, word processor data, graphic data, or text data. The output destination printer 1108 is identification information capable of identifying a printing apparatus that executes print processing.

The output destination printer 1108 is, for example, apparatus name, IP address, or Media Access Control (MAC) address that can identify a printing apparatus. The layout 1109 indicates print setting contents designated by a user. For example, the layout 1109 includes information relating to paper size, two-sided printing, staple processing, etc.

The job ID 1101 is identification information of a print job subjected to print processing and is a unique ID allocated to each job so that the print server 101 can identify a log. The job input date/time 1102 indicates date/time when the print job has been input from client PC 103 to the print server 101. If print processing for a file stored in a box of the MFP is performed, the job input date/time 1102 is time when the print server 101 receives a completion notice of the print processing. The print server 101 includes a timer (not illustrated) that provides date/time information.

The security level 1104 is information indicating a security level of a print object file. The security level of a file can be determined according to predetermined rule(s). For example, a print object file has a lower security level if the storage place is a web page on Internet (i.e., a place where everyone can access). On the other hand, a print object file has a higher security level if the storage place is a local disk in the client PC 103. The security level can be changed according to a type of file or a user ID. If an access right to a file is set, a higher security level is allocated to this file.

The keyword 1110 is keyword(s) that the print server 101 can extract from a print object file. Exemplary keyword extraction processing is described later. The relevant job ID 1111 is information enabling a user to identify relevancy of two or more files consecutively subjected to print processing. More specifically, the relevant job ID 1111 includes a "Prev" field and a "Next" field that can record two or more consecutively executed jobs in a time series order.

It is now assumed that A, B, and C files have been consecutively printed. In this case, the relevant job ID in a print job log of file A records a print job ID of file B in the "Next" field and records nothing in the "Prev" field. The relevant job ID in a print job log of file B records a print job ID of file C in the "Next" field and stores a print job ID of file A in the "Prev" field. The relevant job ID in a print job log of file C records nothing in the "Next" field and stores the print job ID of file B in the "Prev" field.

The format of log illustrated in FIG. 11 is an example and can be modified to include other items.

FIG. 12 illustrates example logs of three consecutively executed print jobs.

In a log 1201 of the first job, the relevant job ID records "Nothing" in the "Prev" field because this job is a head job of the consecutively executed jobs. Furthermore, the relevant job ID records "1000052" (i.e., job ID of the second job to be next executed) in the "Next" field. Similarly, in a log 1202 of the second job, the relevant job ID records "1000023" (i.e., job ID of the first job having been previously executed) in the "Prev" field and records "1000068" (i.e., job ID of the third job to be next executed) in the "Next" field. In a log 1203 of the third job, the relevant job ID records "1000052" (i.e., job ID of the second job having been previously executed) in the "Prev" field and records "Nothing" in the "Next" field because the third job is a final job of the consecutively executed jobs.

Figure 13:
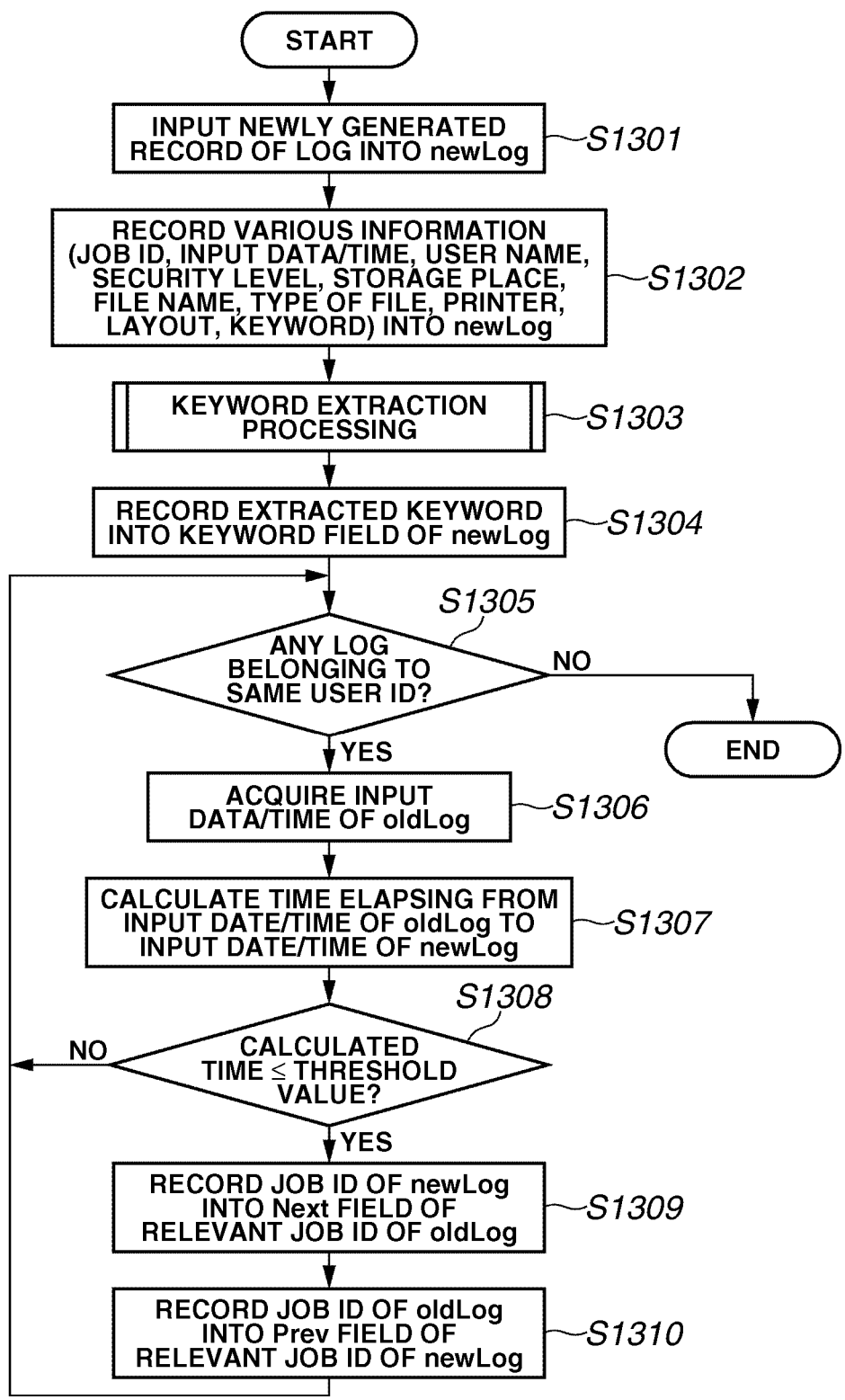
FIG. 13 is a flowchart illustrating log generation processing according to an exemplary embodiment of the present invention.

FIG. 13 illustrates example log generation processing executed by the print server 101. In the print server 101, the CPU executes a program loaded from the HD or ROM to realize each step illustrated in FIG. 13.

At step 1301, the CPU 401 newly generates and registers a record of a log having the format illustrated in FIG. 11. In this case, the CPU 401 stores a pointer of the generated record into a parameter "newLog."

At step 1302, the CPU 401 records various information (job ID, input date/time, user name, security level, storage place, file name, type of file, printer, layout, and keyword" into respective items of the newLog. The CPU 401 records the items of user name, storage place, file name, type of file, printer, and layout based on information included in a print job received from the client PC 103, or based on information included in a print completion notice received from the MFP. Respective items of job ID, input date/time, and security level are not included in a print job or a print completion notice. Therefore, the CPU 401 records these items based on values generated by the print server 101.

Subsequently, at step 1303 (sub routine), the CPU 401 extracts keyword(s) from a print object file. The CPU 401 executes the keyword extraction processing according to a flowchart illustrated in FIG. 14.

At step 1304, the CPU 401 records the extracted keyword(s) into a keyword field of the newLog.

Processing of steps 1305 to 1310 is processing for recording items of the relevant job ID in a log. At step 1305, the CPU 401 determines whether a log recorded in the data storage 102 includes any log having a user ID similar to the user ID of the newLog. If the CPU 401 determines that there is a log having the same user ID (YES in step 1305), the CPU 401 stores a pointer of the detected log into a parameter oldLog.

If there are two or more logs having a user ID similar to the user ID of the newLog, the CPU 401 identifies a log which is latest in the input date/time and stores a pointer of the identified log into the parameter oldLog. Then, the processing flow proceeds to step 1306.

At step 1306, the CPU 401 acquires input date/time information of the oldLog. If the CPU 401 determines that there is not any log having the same user ID (NO in step 1305), the CPU 401 terminates the processing of this routine.

At step 1307, the CPU 401 calculates a time difference between the input date/time of the oldLog and the input date/time of the newLog.

At step 1308, the CPU 401 determines whether the calculated time difference is equal to or less than a threshold value. In this case, the threshold value is a predetermined value set beforehand for the print server 101 and, if necessary, changeable by a system administrator.

If the CPU 401 determines that the elapsed time is greater than the threshold value (NO in step 1308), the processing flow returns to step 1305. At step 1305, the CPU 401 again retrieves a log having a user ID similar to the user ID of the newLog.

If the CPU 401 determines that the elapsed time is equal to or less than the threshold value (YES in step 1308), the processing flow proceeds to step 1309. At step 1309, the CPU 401 records the job ID of the newLog into the "Next" field of the relevant job ID in the oldLog.

At step 1310, the CPU 401 records a job ID of the oldLog into the "Prev" field of the relevant job ID in the newLog.

After completing the processing of step 1310, the processing flow returns to step 1305. If the CPU 401 determines that there is not any log having a user ID similar to the user ID of the newLog (NO in step 1305), the CPU 401 terminates the processing of this routine.

Through the above-described processing, the print server 101 can generate a log of each print job. The print server 101 stores the generated log into the data storage 102.

In the example processing illustrated in FIG. 13, the CPU 401 compares a job input interval with the predetermined threshold value to identify consecutively input jobs. However, the CPU 401 can use other methods. For example, the CPU 401 can regard two or more jobs as "consecutive jobs" if a logging-on state of the client PC 103 or the MFP is maintained during the entry of these jobs.

Figure 14:
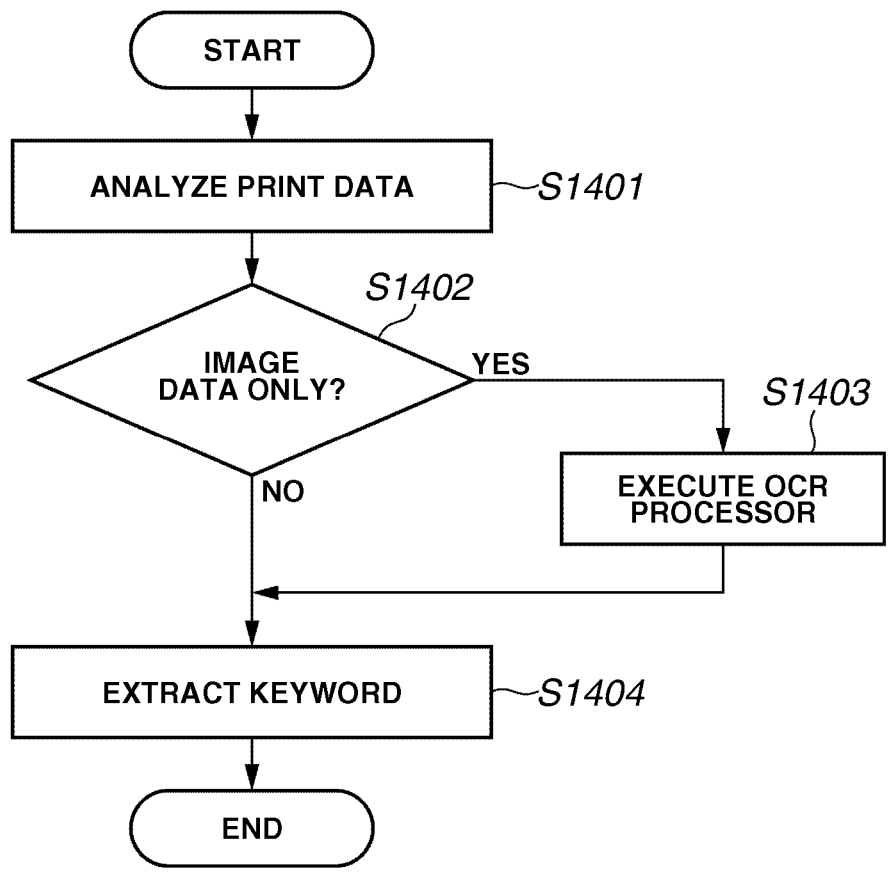
FIG. 14 is a flowchart illustrating keyword extraction processing according to an exemplary embodiment of the present invention.

FIG. 14 illustrates example processing for extracting keyword(s) from a print object file. The CPU 401 of the print server 101 executes the flowchart illustrated in FIG. 14.

At step 1401, the CPU 401 analyzes print data. At step 1402, the CPU 401 determines whether the analyzed print data are all image data. If the CPU 401 determines that the analyzed print data are image data only (YES in step 1402), the processing flow proceeds to step 1403.

At step 1403, the CPU 401 performs Optical Character Reader (OCR) processing on the print data to extract character string information from the image data. If the CPU 401 determines that the analyzed print data include some data other than the image data (NO in step 1402), or if the CPU 401 completes the processing of step 1403, the processing flow proceeds to step 1404.

At step 1404, the CPU 401 detects keyword(s) from the extracted character string information. More specifically, the CPU 401 verifies the extracted character string information with reference to keyword data stored beforehand in the external storage device 411 of the print server 101. Namely, the CPU 401 extracts the keyword data involved in the extracted character string information. If the processing of step 1404 is completed, the CPU 401 terminates the processing routine illustrated in FIG. 14. The keyword data in the print server 101 can be prepared by an administrator or stored according to an appropriate method.

Figure 15:
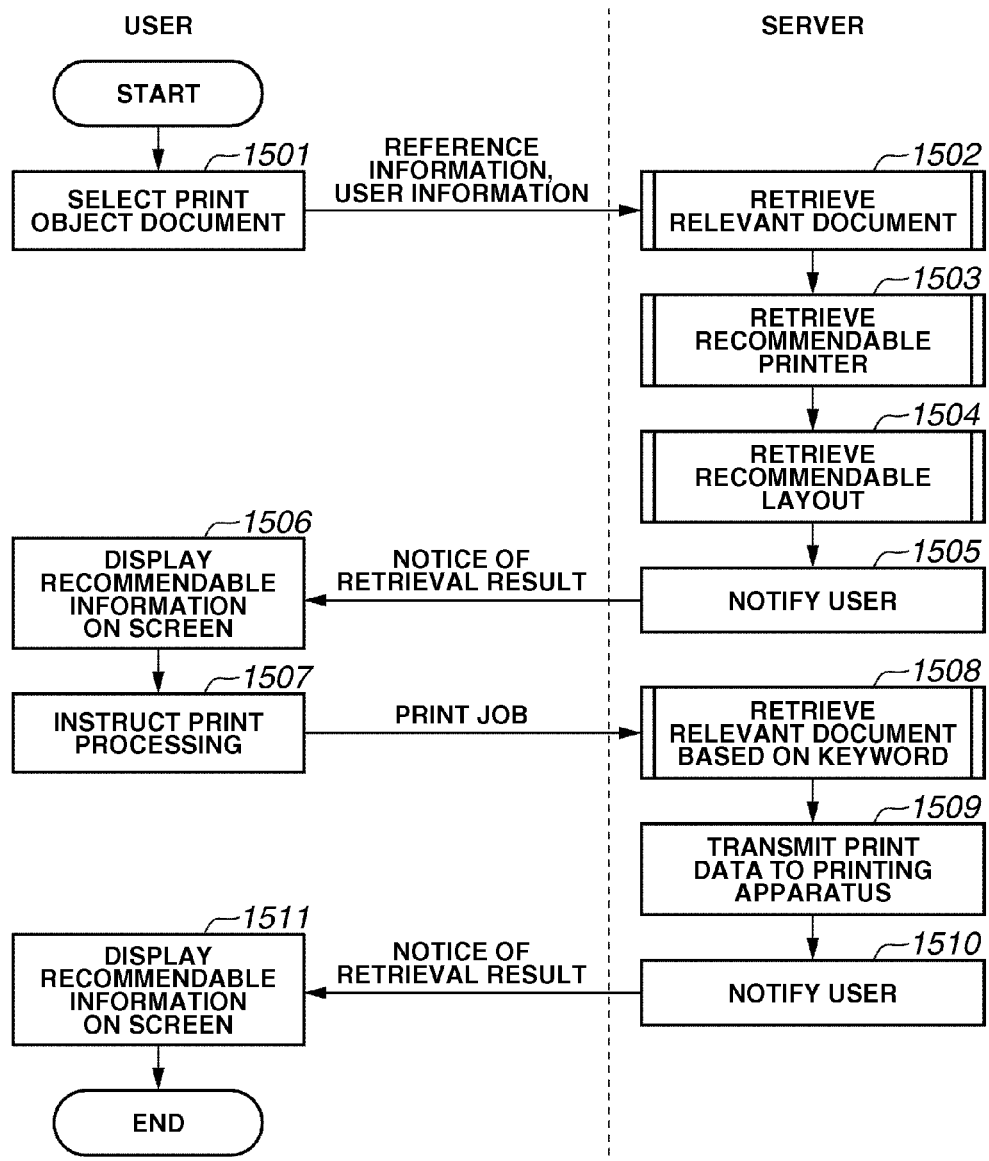
FIG. 15 is a flowchart illustrating an example procedure for notifying a user of recommendable information according to an exemplary embodiment of the present invention.

FIG. 15 is a flowchart illustrating an example procedure for notifying a user of recommendable information according to an exemplary embodiment. FIG. 15 includes a procedure performed by a user who operates the printer driver on the client PC 103 or the touch panel on the MFP and a procedure performed by the print server 101.

At step 1501, the user operating the client PC 103 identifies a print object document and activates the printer driver. In this case, the client PC 103 displays the printer driver screen illustrated in FIG. 7 on its screen. Furthermore, at step 1501, the user operating the MFP designates a desired box number on the screen illustrated in FIG. 9 via the operation unit of the MFP and then selects a desired document on the screen illustrated in FIG. 10.

If a desired document is selected, the client PC 103 or the MFP transmits "reference information" and "user information" to the print server 101. In this embodiment, the "reference information" refers to information including a storage place, a file name, and a type of file of the selected print data. The "user information" refers to information including a user ID and a security level of the user.

Figure 7:
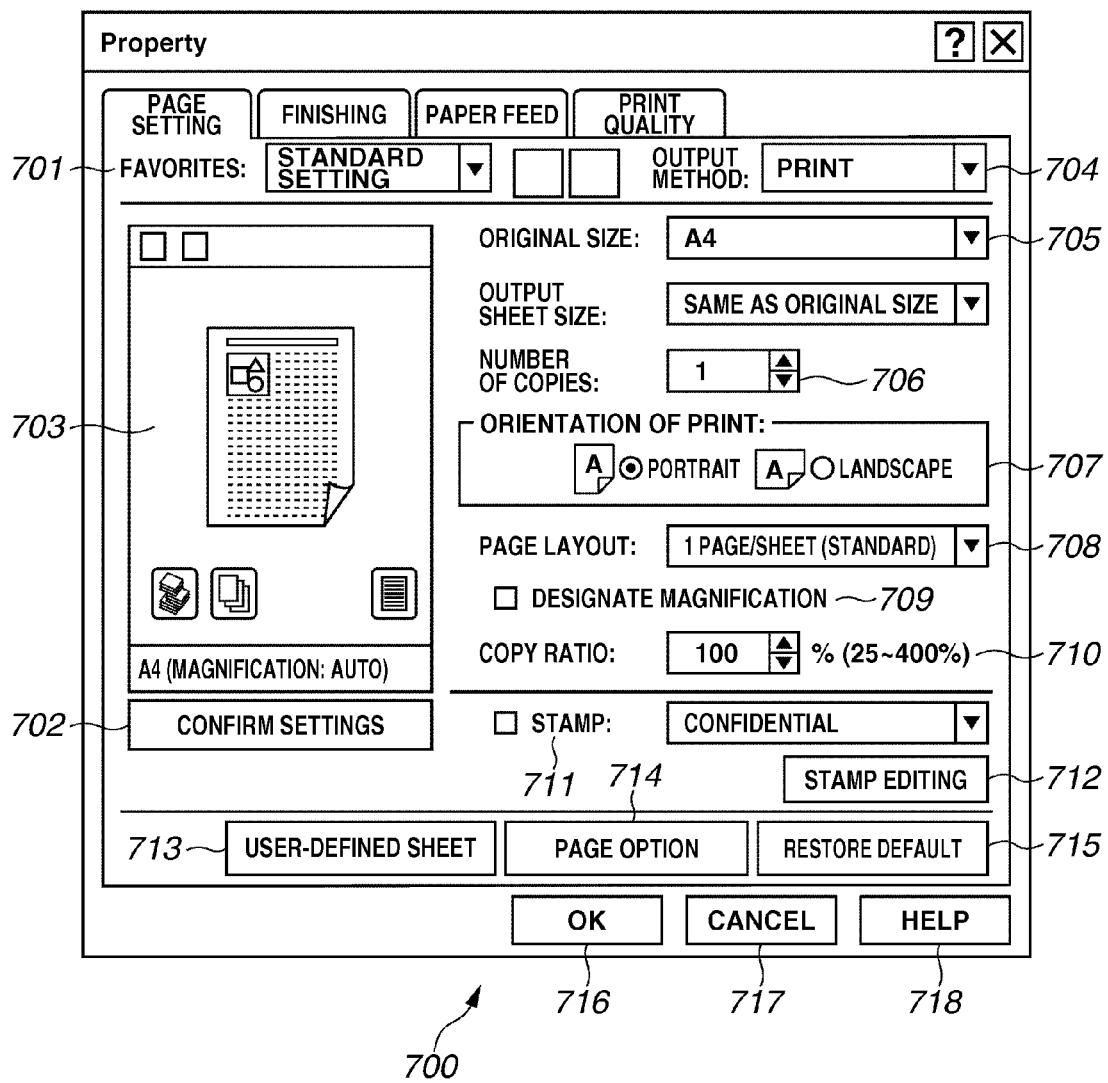
FIG. 7 illustrates a print setting screen according to an exemplary embodiment of the present invention.

A user can instruct transmission of the "reference information" and the "user information" by clicking on a "recommendable information acquisition" button (not illustrated) if provided on the screen of FIG. 7 or 10. In other words, the "recommendable information acquisition" button enables a user to determine whether to acquire the recommendable information.

The print server 101 executes sequential processing of steps 1502 through 1505.

Figure 16:
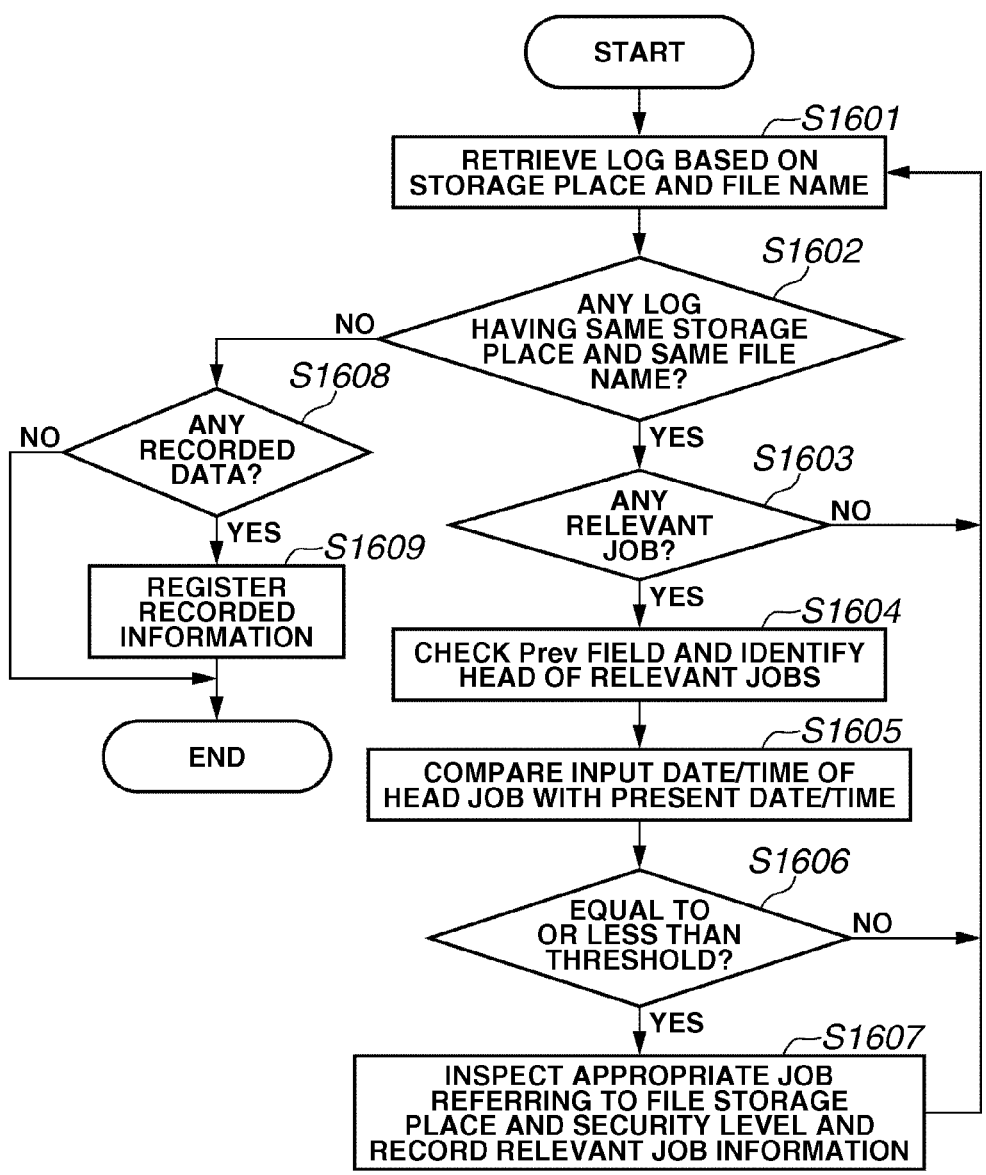
FIG. 16 is a flowchart illustrating relevant document retrieval processing according to an exemplary embodiment of the present invention.

At step 1502, the print server 101 executes relevant document retrieval processing. This processing is for retrieving any file printed together with a file similar to the file transmitted in step 1501 if the printing system has ever printed the same file. FIG. 16 illustrates the details of the processing performed in step 1502. The recommendable information obtained in this processing is useful for a user who performs print processing in the following situations.

For example, if a conference designates materials to be used, each attendant of this conference prepares and carries a print of the required materials. If a combination of these materials is identified based on print job log(s), the printing system can display a combination of documents as recommendable information when another user attending the same conference prints the materials.

For example, a user prints a first web page that publicly introduces a new technology together with a second web page that introduces a relevant technology. In this case, their print job logs remain in the printing system. If the second web page introducing the relevant technology can be notified as recommendable information based on the logs when another user prints the first web page, this user can additionally obtain useful information relating to the newly introduced technology.

Figure 17:
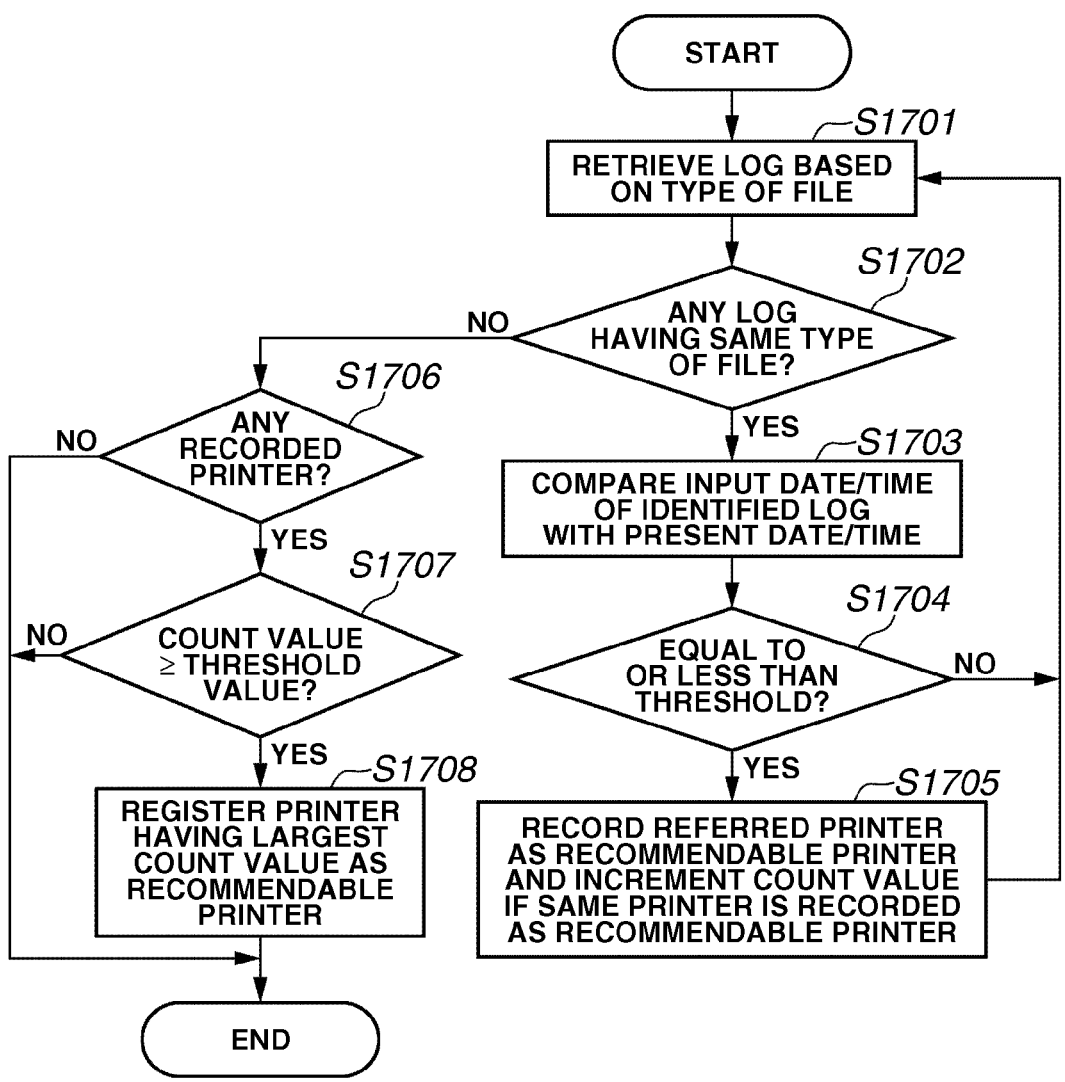
FIG. 17 is a flowchart illustrating recommendable printer retrieval processing according to an exemplary embodiment of the present invention.

At step 1503, the print server 101 executes recommendable printer retrieval processing. This processing is for retrieving a printer that has printed a file similar to the file transmitted in step 1501 if the printing system has ever printed the same file. FIG. 17 illustrates the details of the processing performed in step 1503. The recommendable information obtained in this processing is useful for a user who performs print processing in the following reasons.

For example, a user designates a high-quality color machine for printing data including high-quality images, an image forming apparatus fully supported by post-processing apparatuses for printing data requiring special post-processing, and a high-speed image forming apparatus for printing data including many pages.

If information including a recommendable image forming apparatus (i.e., recommendable information based on the log(s)) is available for a user, the user can properly select an image forming apparatus to be used for print processing of a document.

Figure 18:
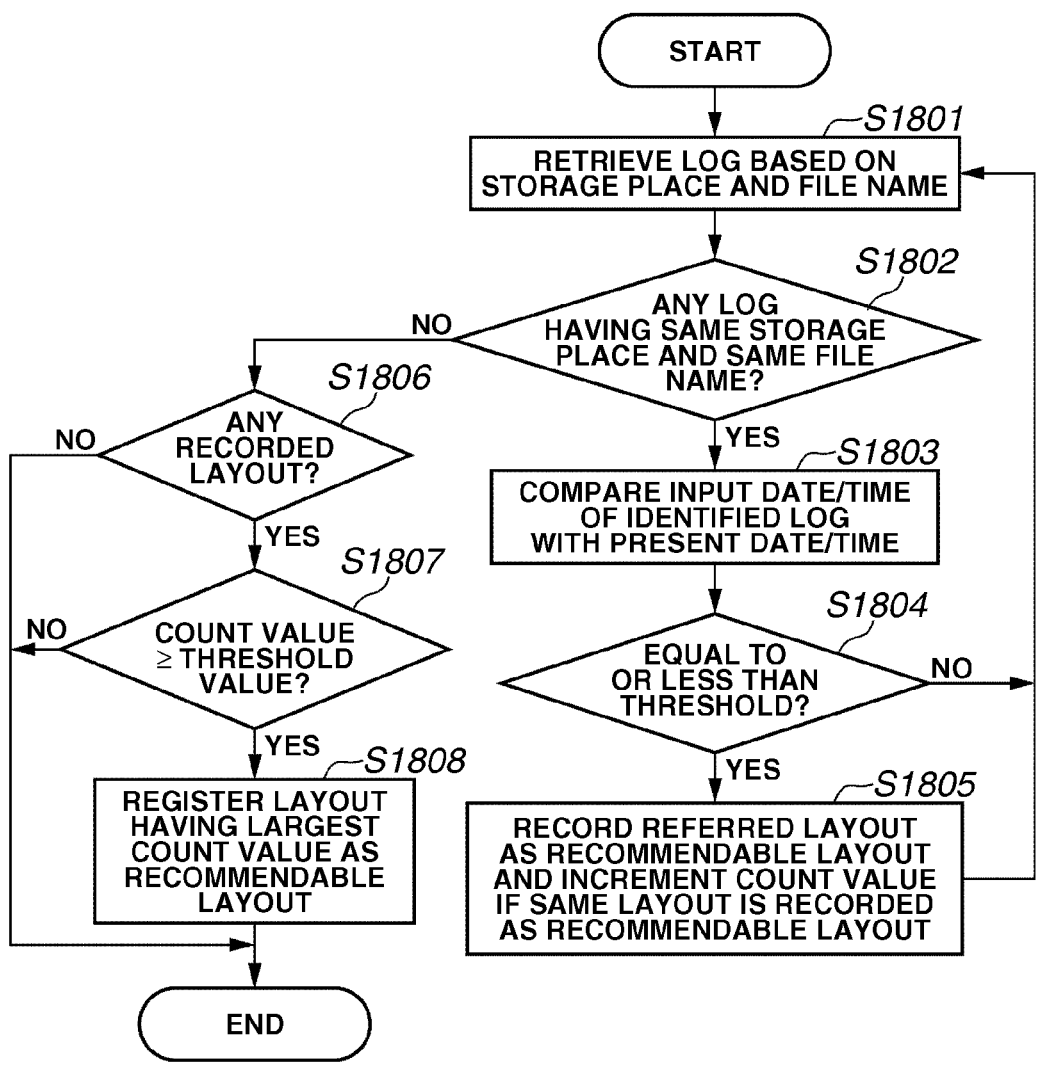
FIG. 18 is a flowchart illustrating recommendable layout retrieval processing according to an exemplary embodiment of the present invention.

At step 1504, the print server 101 executes recommendable layout retrieval processing. This processing is for retrieving a layout of a file similar to the file transmitted in step 1501 if the printing system has ever printed the same file. FIG. 18 illustrates the details of the processing performed in step 1504. The recommendable information obtained in this processing becomes useful for a user who performs print processing for the following reasons.

A document may be printed according to a predetermined print layout, e.g., bookbinding printing or allocation printing. If recommendable layout information (i.e., information recommending a desirable layout for a document to be printed) can be notified based on the log, a user can appropriately perform print layout setting.

At step 1505, the print server 101 transmits a result of retrieval processing performed in steps 1502 through 1504 to the client PC 103 or the MFP.

At step 1506, the client PC 103 or the MFP displays the result of retrieval processing (i.e., information received from the print server 101) on its screen.

Figure 20:
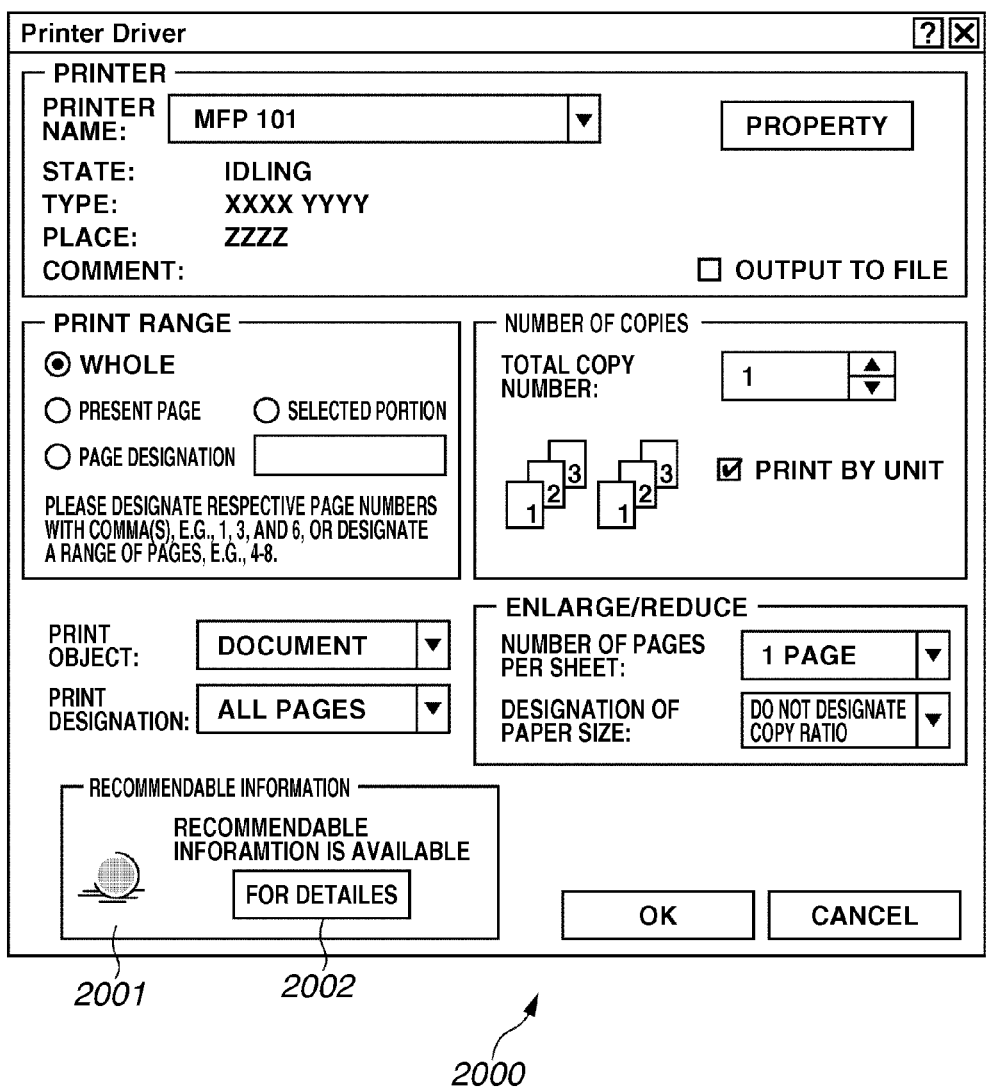
FIG. 20 illustrates an example recommendable information screen (printer driver) according to an exemplary embodiment of the present invention.
Figure 21:
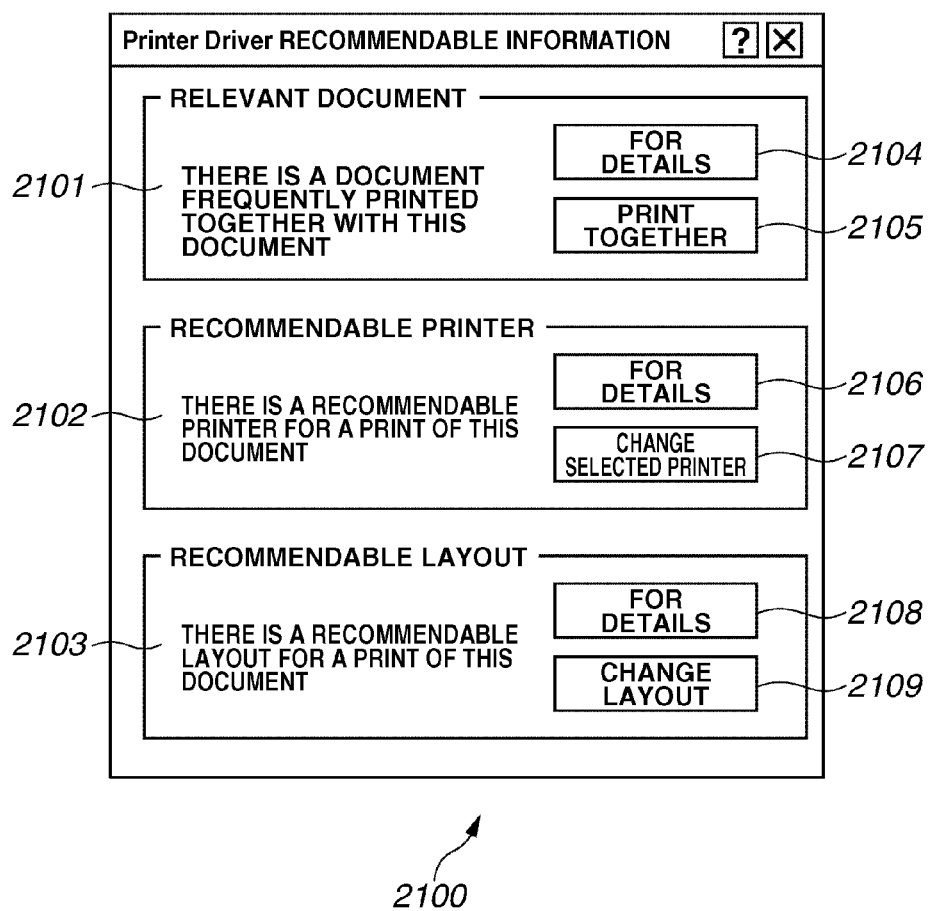
FIG. 21 illustrates a detailed recommendable information screen (printer driver) according to an exemplary embodiment of the present invention.

FIG. 20 illustrates an example screen of the printer driver that the client PC 103 can display in step 1506. Compared to the screen illustrated in FIG. 6, the screen illustrated in FIG. 20 includes a recommendable information field 2001. FIG. 21 is a detailed recommendable information screen displayed when a user clicks on a "FOR DETAILS" button 2002.

The screen illustrated in FIG. 21 can display information relating to three items, i.e., a relevant document 2101 corresponding to the processing of step S1502, a recommendable printer 2102 corresponding to the processing of step S1503, and a recommendable layout 2103 corresponding to the processing of step S1504. If a user clicks on a "FOR DETAILS" button 2104, 2106, or 2108, the screen displays the details of the relevant document 2101, the recommendable printer 2102, or the recommendable layout 2103.

A user can click on a "PRINT TOGETHER" button 2105 to instruct print processing for the relevant document retrieved by the processing of step 1502 in addition to a presently selected document. If a user clicks on a "CHANGE SELECTED PRINTER" 2107, the output destination printer (701 illustrated in FIG. 7) is changed to the printer retrieved by the processing of step 1503. If a user clicks on a "CHANGE LAYOUT" button 2109, the print layout (layout set in FIG. 8) is changed to the layout retrieved by the processing of step 1504.

Figure 22:
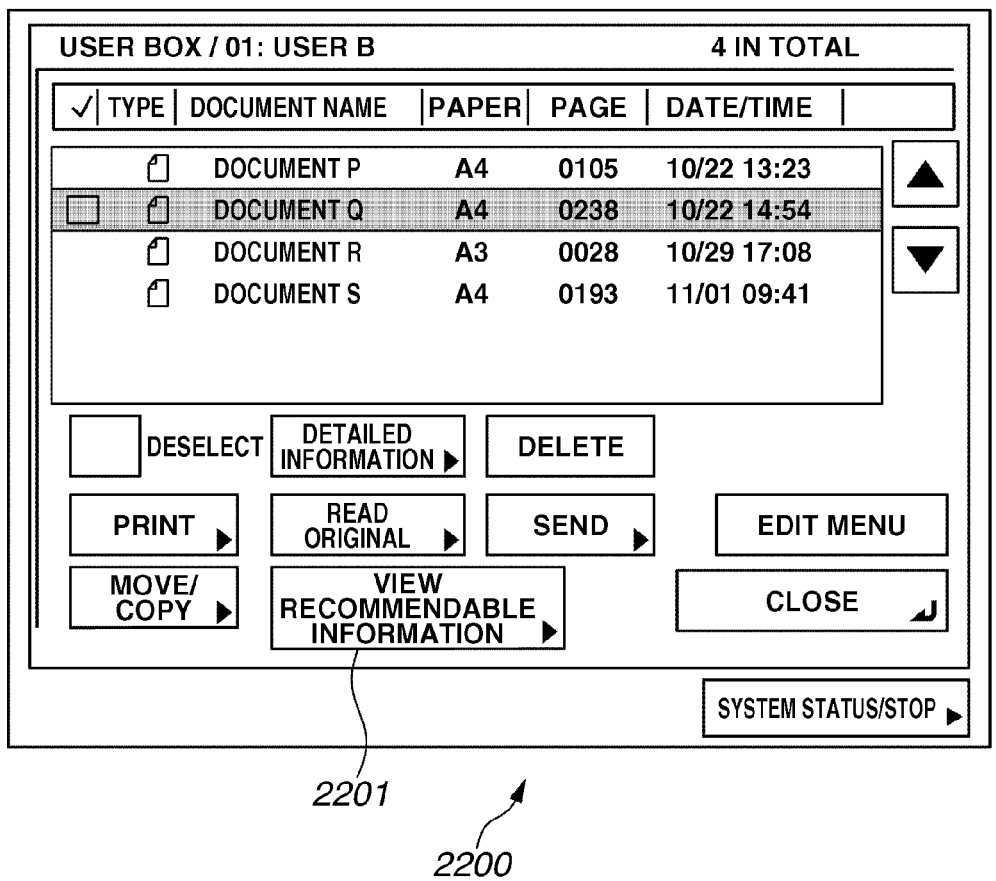
FIG. 22 illustrates an example recommendable information screen (touch panel) according to an exemplary embodiment of the present invention.
Figure 23:
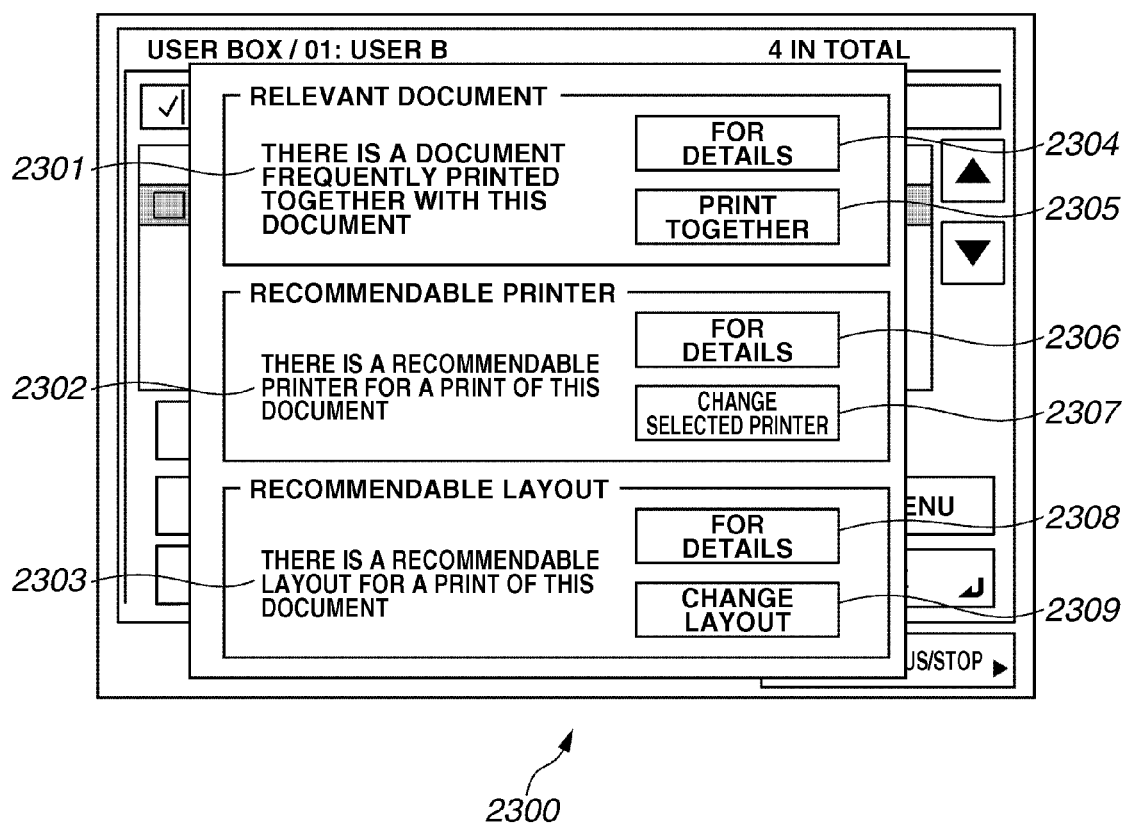
FIG. 23 illustrates a detailed recommendable information screen (touch panel) according to an exemplary embodiment of the present invention.

FIG. 22 illustrates an example of the print setting screen that the MFP can display on its display unit in step 1506. Compared to the screen illustrated in FIG. 10, the screen illustrated in FIG. 22 includes a "VIEW RECOMMENDABLE INFORMATION" button 2201. FIG. 23 is a detailed recommendable information screen displayed when a user clicks on the "VIEW RECOMMENDABLE INFORMATION" button 2201.

The screen illustrated in FIG. 23 can display information relating to three items, i.e., a relevant document 2301 corresponding to the processing of step S1502, a recommendable printer 2302 corresponding to the processing of step S1503, and a recommendable layout 2303 corresponding to the processing of step S1504. If a user clicks on a "FOR DETAILS" button 2304, 2306, or 2308, the screen displays the details of the relevant document 2301, the recommendable printer 2302, or the recommendable layout 2303.

A user can click on a "PRINT TOGETHER" button 2305 to instruct print processing for the relevant document retrieved by the processing of step 1502 in addition to a presently selected document. If a user clicks on a "CHANGE SELECTED PRINTER" 2307, the output destination printer is changed to the printer retrieved by the processing of step 1503. If a user clicks on a "CHANGE LAYOUT" button 2309, the print layout is changed to the layout retrieved by the processing of step 1504. The printer drivers and the screens of the MFP illustrated in FIGS. 20 through 23 can be modified in various ways.

At step 1507, if a user instructs print processing, the client PC 103 or the MFP transmits a print job to the print server 101. In this embodiment, the print job includes print information in addition to the above-described reference information and user information. The print information includes print data generated based on a selected file, together with print setting information (layout) and output destination printer information.

Figure 19:
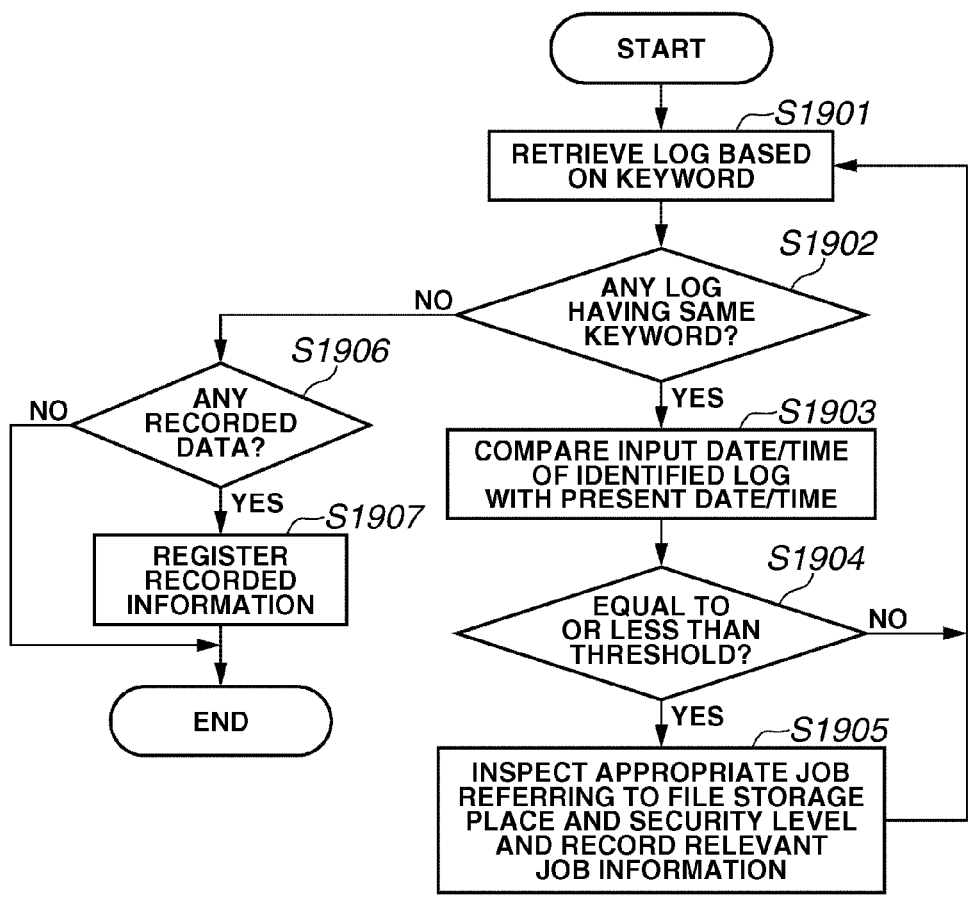
FIG. 19 is a flowchart illustrating keyword-based relevant document retrieval processing according to an exemplary embodiment of the present invention.

At step 1508, the print server 101 executes processing for retrieving a relevant document based on keyword(s). The processing performed in step 1508 is processing for retrieving other print data including keyword(s) extracted from print data that is included in the print job transmitted by the processing of step 1507, from print data printed in previous print processing. FIG. 19 illustrates the details of the processing performed in step 1508.

The recommendable information obtained through the above-described processing is useful for a user who performs print processing in the following situations. For example, it may be desirable for a user to simultaneously print a plurality of documents belonging to a specific category (e.g., budget-related materials for the next fiscal year). It is desirable to analyze the contents of each document and record extracted keyword(s) in a log. If another user requests a print of a document belonging to the same category, it is useful to present recommendable information including relevant document(s) so that the user can know the presence of any relevant materials. The usability can be improved.

At step 1509, the print server 101 transmits print data to the MFP (printer) that executes print processing (i.e., the output destination printer included in the received print job).

At step 1510, the print server 101 transmits a notice of retrieval result obtained by the processing of step 1508 to the client PC 103 or the MFP.

At step 1511, the client PC 103 or the MFP receives the notice of retrieval result from the print server 101 and displays the received retrieval result on its screen.

There are various methods for transmitting a notice (step 1510) and displaying information (step 1511). For example, a print completion screen illustrated in FIG. 24 can display a result of the processing performed in step 1508.

Figure 24:
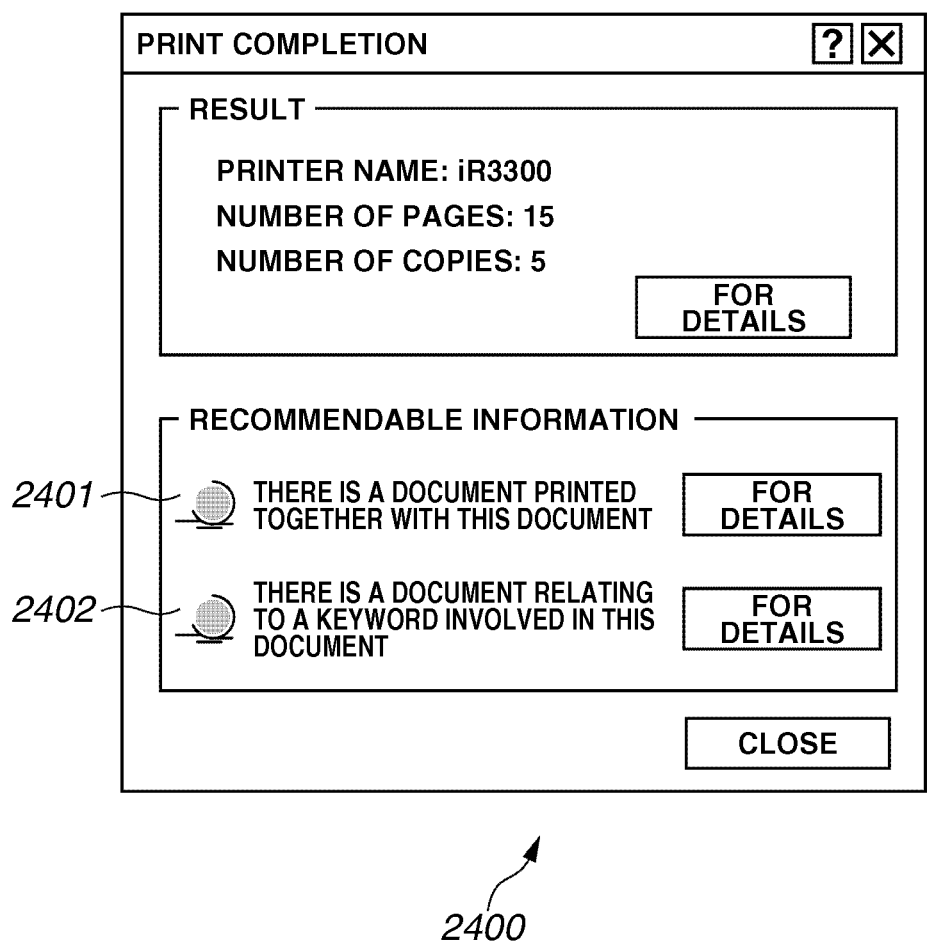
FIG. 24 illustrates an example print completion screen according to an exemplary embodiment of the present invention.

The screen illustrated in FIG. 24 is an example print completion screen 2400 of the printer driver, which includes a field 2401 that displays a result of retrieval processing obtained by the processing of step 1502 and a field 2402 that displays relevant document(s) retrieved based on the keyword(s) obtained by the processing of step 1508.

As another method, a box print completion screen including recommendable information similar to the information illustrated in FIG. 24 can be displayed on a touch panel. As another method, an electronic mail can be transmitted if an electronic-mail address of a user is registered beforehand in the print server 101. As another method, previous recommendable information can be displayed when the printer driver screen is opened again.

Similarly, previous recommendable information can be displayed when the box print screen is opened on the touch panel. As another method, any application constantly operating on a PC can be used. If software application capable of monitoring recommendable information is installed, the print server 101 can asynchronously inform the PC of any presence of recommendable information.

There are various methods for notifying and displaying recommendable information. It is desirable to enable a user to select one or more desirable methods for notifying and displaying recommendable information, so that the notification/display processing can be performed according to user's preference (e.g., a method registered beforehand in the server).

FIG. 16 is a flowchart illustrating example processing for retrieving relevant document(s) that the print server 101 can execute. The processing illustrated in FIG. 16 is the details of the processing performed in step 1502 of FIG. 15.

To realize each step illustrated in FIG. 16, the CPU 401 of the print server 101 executes a program loaded from the HD or the ROM.

In the following description, it is assumed that the data storage 102 stores the logs 1201, 1202, and 1203 illustrated in FIG. 12. The storage place of a file transmitted in step 1501 illustrated in FIG. 15 is "¥¥BOX89¥078937¥2006." The file name is "design drawing for living room 32." The security level of user is "C."

At step 1601, the CPU 401 accesses the data storage 102 and retrieves log(s) similar in file name and storage place (i.e., part of the received information). In this exemplary embodiment, the CPU 401 performs retrieval processing by comparing each one of a plurality of logs stored in the data storage 102 with the received information with respect to the file name and the storage place.

At step 1602, the CPU 401 determines whether there is any log having the same storage place and the same file name. If the CPU 401 determines that there is a log having the same storage place and the same file name (YES in step 1602), the processing flow proceeds to step 1603. In the above-described example, the CPU 401 retrieves a log having the file name "design drawing for living room 32" and the storage place "¥¥BOX89¥078937¥2006" among the logs illustrated in FIG. 12. As a result, the CPU 401 detects the log 1202.

At step 1603, the CPU 401 determines whether any value is set in the "Next" or "Prev" field of the relevant job ID item of the found log. If the CPU 401 determines that there is not any value set in the "Next" or "Prev" field (NO in step 1603), the processing flow returns to step 1601 in which the CPU 401 executes processing for retrieving another log. If the CPU 401 determines that there is a value set in the "Next" or "Prev" field (YES in step 1603), the processing flow proceeds to step 1604.

At step 1604, the CPU 401 checks the "Prev" field and identifies a head of consecutively printed jobs according to the log. According to the example illustrated in FIG. 12, the log 1202 includes the job ID 1000023 recorded in the "Prev" field of the relevant job ID. Therefore, as a result of retrieval processing, the CPU 401 detects the log 1201 which has the same ID.

Similarly, the CPU 401 checks the "Prev" field of the relevant job ID in the log 1201. As the log 1201 records "Nothing" in the "Prev" field of the relevant job ID, the CPU 401 determines that the log 1201 is a log of a head job of the consecutively input jobs.

At step 1605, the CPU 401 calculates an elapsed time based on a difference between the present date/time and the input date/time of a job corresponding to the log identified by the processing of step 1604. The CPU 401 can refer to a timer (not illustrated) provided in the print server 101 to determine the present date/time.

At step 1606, the CPU 401 compares the elapsed time calculated by the processing of step 1605 with a predetermined threshold value set for the print server 101. The threshold value is a value determined by an administrator of the printing system and registered according to an appropriate flowchart (not illustrated).

If the CPU 401 determines that the calculated difference is greater than the threshold value (NO in step 1606), the processing flow returns to step 1601 in which the CPU 401 executes processing for retrieving another log. If the CPU 401 determines that the calculated difference is equal to or less than the threshold value (YES in step 1606), the processing flow proceeds to step 1607.

At step 1607, the CPU 401 checks the log retroactively from the head of the consecutively input jobs obtained by the processing of step 1604. Then, the CPU 401 inspects an appropriate job referring to the file storage place and the security level. If there is an appropriate job, the CPU 401 records this job as relevant job information (notification information).

If the storage place of a file corresponding to the log is a local storage of a PC of the user who inputs the file, the CPU 401 does not notify any relevant job information. Similarly, if the security level of the log is higher than the security level of a user who performs print processing, the CPU 401 does not notify any relevant job information.

According to the above-described example, the storage place of the head job (i.e., job corresponding to the log 1201) is a file server accessible via network and the security level of this job is set to E. The security level of a user who performs print processing is C. The security level E is lower than the security level C. Therefore, the CPU 401 notifies the relevant job information.

Then, the CPU 401 inspects the "Next" field of the relevant job ID in the log 1201 and detects the job ID "1000052" of the next executed job. Therefore, the CPU 401 checks the log 1202 having the same job ID. However, the file of the log 1202 is similar to the print object file and is inappropriate as relevant job. Accordingly, the CPU 401 does not notify the log 1202 as relevant job information.

Next, the CPU 401 inspects the "Next" field of the relevant job ID in the log 1202 and detects the job ID "1000068" of the next executed job. Therefore, the CPU 401 checks the log 1203 having the same job ID. Similarly, the CPU 401 inspects the storage place and the security level of a file of the log 1203.

The storage place of the file in the log 1203 is the local storage of a PC and is inappropriate as relevant job. Accordingly, the CPU 401 does not notify the file of the log 1203 as relevant job information. Then, the CPU 401 detects "Nothing" recorded in the "Next" field of the relevant job ID and determines that the job corresponding to log 1203 is the final job of the consecutively executed jobs.

After completing the processing of step 1607, the processing flow returns to step 1601 in which the CPU 401 executes processing for retrieving another log. If the CPU 401 determines that there is not any log having the same storage place and the same file name (NO in step 1602), the processing flow proceeds to step 1608.

At step 1608, the CPU 401 determines whether there is any recorded job as notification information resulting from the processing of step 1607. If the CPU 401 determines that there is not any recorded information, (NO in step 1608), the CPU 401 sends a message informing that there is not any relevant job and terminates the processing illustrated in FIG. 16.

If the CPU 401 determines that there is recorded information (YES in step 1608), the processing flow proceeds to step 1609. At step 1609, the CPU 401 registers the recorded information as information to be transmitted in step 1505 illustrated in FIG. 15 and terminates the processing of this routine.

According to the example illustrated in FIG. 16, the CPU 401 notifies a log satisfying a plurality of conditions as a relevant job. Namely, even if there is a log having the same storage place and the same file name, the CPU 401 does not notify any information if there is not any relevant job satisfying the determination condition of step 1604.

Hence, if there is any log having the same storage place and the same file name, the CPU 401 can extract a user name recorded in the log and notify any other file having been printed by this user as relevant document. In this case, the CPU 401 retrieves a log from the data storage 102 based on the extracted user name. Similar to step 1608, the CPU 401 can notify any retrieved log, if it satisfies conditions with respect to the storage place and the security level, as relevant document information.

FIG. 17 illustrates example processing performed by the print server 101 that retrieves a recommendable printer. The processing illustrated in FIG. 17 is detailed processing performed in step 1503 illustrated in FIG. 15.

To realize each step illustrated in FIG. 17, the CPU 401 of the print server 101 executes a program loaded from the HD or the ROM.

In the following description, it is assumed that the data storage 102 stores logs 2501 through 2508 illustrated in FIG. 25. The storage place of a file transmitted in step 1501 illustrated in FIG. 15 is "¥¥BOX89¥078937¥2006." The file name is "design drawing for living room 32." The type of file is "graphic data." The security level of user is "C."

At step 1701, the CPU 401 accesses the data storage 102 and retrieves log(s) similar in type of file (i.e., part of the received information). In this exemplary embodiment, the CPU 401 performs retrieval processing by comparing each one of a plurality of logs stored in the data storage 102 with the received information with respect to the type of file.

At step 1702, the CPU 401 determines whether there is any log having the same type of file. If the CPU 401 determines that there is a log having the same type of file (YES in step 1702), the processing flow proceeds to step 1703. In the above-described example, the CPU 401 retrieves a log having the type of file "graphic data" among the logs illustrated in FIG. 25. As a result, the CPU 401 detects the logs 2503 and 2505.

At step 1703, the CPU 401 calculates an elapsed time based on a difference between the present date/time and the input date/time of a job corresponding to the log detected by the processing of step 1702. The CPU 401 can refer to a timer (not illustrated) provided in the print server 101 to determine the present date/time.

At step 1704, the CPU 401 compares the elapsed time calculated by the processing of step 1703 with a predetermined threshold value set for the print server 101. The threshold value is a value determined by an administrator of the printing system and registered according to an appropriate flowchart (not illustrated). If the CPU 401 determines that the calculated difference is greater than the threshold value (NO in step 1704), the processing flow returns to step 1701 in which the CPU 401 executes processing for retrieving another log.

If the CPU 401 determines that the calculated difference is equal to or less than the threshold value (YES in step 1704), the processing flow proceeds to step 1705. For example, according to the example illustrated in FIG. 25, if the present date/time is "2006/12/5 18:45:45" and the threshold value having been set is "one week", the CPU 401 determines that the log 2505 satisfies the determination condition of step 1704 and determines that the log 2503 does not satisfy the determination condition of step 1704.

At step 1705, the CPU 401 refers to the printer field of a log which has been subjected to the determination processing of step 1704. According to the example illustrated in FIG. 25, the CPU 401 refers to a printer "32-OA-iRC3220" in the log 2505. Then, in step S1705, the CPU 401 registers the referred printer name as recommendable printer. In this case, if the same printer is already registered as a recommendable printer, the CPU 401 increments a counter value.

By executing a comparison between the calculated time difference and the threshold value (steps 1703 and 1704), the CPU 401 can extract only the printer having been recently used as recommendable information. Namely, the CPU 401 does not notify any old printer as recommendable information. However, the processing of steps 1703 and 1704 can be omitted if extracting a recommendable printer regardless of old and new is preferable.

Then, the processing flow returns to step 1701 in which the CPU 401 executes processing for retrieving another log. If the CPU 401 determines that there is not any log having the same type of file (NO in step 1702), the processing flow proceeds to step 1706.

At step 1706, the CPU 401 determines whether the printer (i.e., recommendable printer) registered in step 1705 is present on the network. More specifically, the print server 101 transmits via the network a retrieval packet including a keyword (printer name) registered as recommendable printer.

If there is a printer corresponding to the keyword, the CPU 401 determines that the recommendable printer is present on the network.

If the CPU 401 determines that the recommendable printer is present (YES in step 1706), the processing flow proceeds to step 1707. If the CPU 401 determines that the recommendable printer is not present (NO in step 1706), the CPU 401 terminates the processing of this routine.

At step 1707, the CPU 401 determines whether the counter value recorded by the processing of step 1705 is equal to or greater than a predetermined threshold value. The threshold value is a value determined by an administrator of the printing system and registered according to an appropriate flowchart (not illustrated).

If there is not any printer satisfying the above determination condition (NO in step 1707), the CPU 401 determines that there is no recommendable printer and terminates the processing of this routine. If there is a printer satisfying the above determination condition (YES in step 1707), the processing flow proceeds to step 1708.

At step 1708, the CPU 401 registers notification information to transmit a notification indicating that the identified printer is a recommendable printer, to the client PC 103 or the MFP. In this case, if two or more printers are detected by the processing of step 1707, the CPU 401 can specify a printer having a highest counter value as recommendable printer.

Alternatively, the CPU 401 can notify each printer satisfying the determination condition of step 1707 together with its counter value, to enable a user to know a printer which has been frequently used.

In steps 1701 and 1702 of the example processing illustrated in FIG. 17, the CPU 401 retrieves a log based on the type of file. Thus, a user can know a printer frequently used for printing a file similar in type to the file that a user wants to print.

However, the retrieval key used in step 1702 is not limited to the type of file. For example, the CPU 401 can use a file name and a storage place as retrieval keys in the processing of step 1702. In this case, a user can know a printer frequently used for printing a file similar in file name and storage place to the file that a user wants to print.

FIG. 18 illustrates example processing performed by the print server 101 that retrieves a recommendable layout. The processing illustrated in FIG. 18 is detailed processing performed in step 1504 illustrated in FIG. 15.

To realize each step illustrated in FIG. 18, the CPU 401 of the print server 101 executes a program loaded from the HD or the ROM.

In the following description, it is assumed that the data storage 102 stores the logs 2501 through 2508 illustrated in FIG. 25. The storage place of a file transmitted in step 1501 illustrated in FIG. 15 is "¥¥fileserver1¥2006." The file name is "budget for fiscal 2006." The security level of user is "C."

At step 1801, the CPU 401 accesses the data storage 102 and retrieves log(s) similar in file name and storage place (i.e., part of the received information). In this exemplary embodiment, the CPU 401 performs retrieval processing by comparing each one of a plurality of logs stored in the data storage 102 with the received information with respect to the file name and the storage place.

At step 1802, the CPU 401 determines whether there is any log having the same file name and the same storage place. If the CPU 401 determines that there is a log having the same storage place and the same file name (YES in step 1802), the processing flow proceeds to step 1803. In the above-described example, the CPU 401 retrieves a log having the file name "budget for fiscal 2006" and the storage place "¥¥fileserver1¥2006" among the logs illustrated in FIG. 25. As a result, the CPU 401 detects the logs 2501 and 2504.

At step 1803, the CPU 401 calculates an elapsed time based on a difference between the present date/time and the input date/time of a job corresponding to the log detected by the processing of step 1802. The CPU 401 can refer to a timer (not illustrated) provided in the print server 101 to determine the present date/time.

At step 1804, the CPU 401 compares the elapsed time calculated by the processing of step 1803 with a predetermined threshold value set for the print server 101. The threshold value is a value determined by an administrator of the printing system and registered according to an appropriate flowchart (not illustrated).

If the CPU 401 determines that the calculated difference is greater than the threshold value (NO in step 1804), the processing flow returns to step 1801 in which the CPU 401 executes processing for retrieving another log. If the CPU 401 determines that the calculated difference is equal to or less than the threshold value (NO in step 1804), the processing flow proceeds to step 1805.

For example, according to the example illustrated in FIG. 25, if the present date/time is "2006/12/5 18:45:45" and the threshold value having been set is "one week", the CPU 401 determines that the log 2504 satisfies the determination condition of step 1804 and determines that the log 2501 does not satisfy the determination condition of step 1804.

At step 1805, the CPU 401 refers to the layout field of a log which has been subjected to the determination processing of step 1804. According to the example illustrated in FIG. 25, the CPU 401 refers to a layout "2 in 1, two-sided" in the log 2504. Then, in step S1805, the CPU 401 registers the referred layout as recommendable layout. In this case, if the same layout is already registered as recommendable layout, the CPU 401 increments a counter value.

By executing a comparison between the calculated time difference and the threshold value (steps 1803 and 1804), the CPU 401 can extract only the printer having been recently used as recommendable information. However, the processing of steps 1703 and 1704 can be omitted if unnecessary.

Then, the processing flow returns to step 1801 in which the CPU 401 executes processing for retrieving another log. If the CPU 401 determines that there is not any log having the same storage place and the same file name (NO in step 1802), the processing flow proceeds to step 1806.

At step 1806, the CPU 401 determines whether there is any layout registered as recommendable layout in step 1805. If the CPU 401 determines that a recommendable layout is present (YES in step 1806), the processing flow proceeds to step 1807. If the CPU 401 determines that there is not any recommendable layout (NO in step 1806), the CPU 401 terminates the processing of this routine.

At step 1807, the CPU 401 determines whether the counter value recorded by the processing of step 1805 is equal to or greater than a threshold value. The threshold value is a value determined by an administrator of the printing system and registered according to an appropriate flowchart (not illustrated).

If the CPU 401 determines that there is no layout having a count value exceeding the threshold value, i.e., if there is not any recommendable layout (NO in step 1807), the CPU 401 terminates the processing of this routine. If the CPU 401 determines that there is a layout having a count value exceeding the threshold value, i.e., if there is a recommendable layout (YES in step 1807), the processing flow proceeds to step 1808.

At step 1808, the CPU 401 registers notification information to transmit a notification indicating that the identified printer is a recommendable printer, to the client PC 103 or the MFP. In this case, if two or more printers are detected by the processing of step 1807, the CPU 401 can specify a printer having a highest counter value as recommendable printer.

Alternatively, the CPU 401 can notify each printer satisfying the determination condition of step 1807 together with its counter value, to enable a user to know a printer which has been frequently used.

FIG. 19 illustrates example processing performed by the print server 101 that retrieves a relevant document based on keyword(s). The processing illustrated in FIG. 19 is detailed processing performed in step 1508 illustrated in FIG. 15.

To realize each step illustrated in FIG. 19, the CPU 401 of the print server 101 executes a program loaded from the HD or the ROM.

In the following description, it is assumed that the data storage 102 stores the logs 2501 through 2508 illustrated in FIG. 25. The keywords extracted as a result of the keyword extraction processing illustrated in FIG. 14 are "2006 fiscal year", "budget", and "equipment cost."

At step 1901, the CPU 401 accesses the data storage 102 and retrieves log(s) similar in keyword (i.e., information extracted from the print object file). In this exemplary embodiment, the CPU 401 performs retrieval processing by comparing each one of a plurality of logs stored in the data storage 102 with the received information with respect to the keyword.

At step 1902, the CPU 401 determines whether there is any log having a keyword similar to the extracted keyword. If the CPU 401 determines that there is a log having the same keyword (YES in step 1902), the processing flow proceeds to step 1903. In the above-described example, the CPU 401 retrieves a log that records "2006 fiscal year", "budget", and "equipment cost" in the keyword 1110 among the logs illustrated in FIG. 25. As a result, the CPU 401 detects the logs 2502, 2505, and 2508.

At step 1903, the CPU 401 calculates an elapsed time based on a time difference between the present date/time and the input date/time of a job corresponding to the log detected by the processing of step 1902. The CPU 401 can refer to a timer (not illustrated) provided in the print server 101 to determine the present date/time.

At step 1904, the CPU 401 compares the elapsed time calculated by the processing of step 1903 with a predetermined threshold value set for the print server 101 and determines whether a difference between compared values is equal to or less than a threshold value. The threshold value is a value determined by an administrator of the printing system and registered according to an appropriate flowchart (not illustrated).

If the CPU 401 determines that the difference is greater than the threshold value (NO in step 1904), the processing flow returns to step 1901 in which the CPU 401 executes processing for retrieving another log. If the CPU 401 determines that the difference is equal to or less than the threshold value (YES in step 1904), the processing flow proceeds to step 1905.

For example, according to the example illustrated in FIG. 25, if the present date/time is "2006/12/5 18:45:45" and the threshold value is set to one week, the CPU 401 determines that the logs 2505 and 2508 satisfy the determination condition of step 1904 and the log 2502 does not satisfy the determination condition of step 1904.

At step 1905, the CPU 401 checks whether the job obtained by the processing of step 1904 is appropriate as notification information with reference to the information recorded in the file storage place 1105 and the security level 1104. If the job is appropriate, the CPU 401 records this job as relevant job information (notification information).

The processing of step 1905 is similar to the processing of step 1607 illustrated in FIG. 16. In the above-described example, if the security level of a user who performs print processing is "B", the CPU 401 determines that a job corresponding to the log 1408 is appropriate as notification information.

If the processing of step 1905 is completed, the processing flow returns to step 1901 in which the CPU 401 executes processing for retrieving another log. If the CPU 401 determines that there is not any log having the same keyword (NO in step 1902), the processing flow proceeds to step 1906.

At step 1906, the CPU 401 determines whether there is any recorded job as notification information resulting from the processing of step 1905. If the CPU 401 determines that there is not any recorded information, (NO in step 1906), the CPU 401 sends a message informing that there is not any relevant job and terminates the processing illustrated in FIG. 19.

If the CPU 401 determines that there is recorded information (YES in step 1906), the processing flow proceeds to step 1907. At step 1907, the CPU 401 registers the recorded information as information to be transmitted in step 1505 illustrated in FIG. 15 and terminates the processing of this routine.

As described above, exemplary embodiments of the present invention enable a user performing print processing to know various recommendable information relating to a print object file.

In particular, if the printing system has ever printed file(s) similar to a print object file, an exemplary embodiment enables a user to know another file(s) printed together with the similar file(s). Thus, a user can easily find file(s) relevant to the print object file.

In an exemplary embodiment, the printing system can identify a printer that has been frequently used to print files similar to a print object file. Thus, a user can easily find a printer suitable for printing the print object file.

In an exemplary embodiment, the printing system can identify a print layout having been used for files similar to a print object file. Thus, a user can easily find a print layout suitable for printing the print object file.

In an exemplary embodiment, the printing system can identify another files including keyword(s) of a print object file. Thus, a user can easily find file(s) relevant to the print object file.

In an exemplary embodiment, the printing system enables a user to obtain part of the above-described four types of recommendable information. In this case, the printer driver operation screen illustrated in FIG. 6 or the box operation screen illustrated in FIG. 10 includes an additional button that a user can operate to select recommendable information if necessary.

For example, a user can obtain only the recommendable printer information or obtain only the recommendable layout information.

The present invention can be applied to a system including two or more devices (host computer, interface device, reader, printer, etc.) and also applied to a single device (copy machine, facsimile apparatus, etc.).

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-053053 filed Mar. 2, 2007, which is hereby incorporated by reference herein in its entirety.

What is claimed is:

1. A printing system comprising:
a storage unit adapted to store a plurality of logs, each of which including data indicating a document that has been printed and data indicating a printer that has printed the document;
a selecting unit adapted to select a document to be printed;
a retrieving unit adapted to retrieve information indicating a recommendable printer for printing the document selected by the selecting unit, based on the logs stored in the storage unit, wherein the retrieving unit retrieves, as the information indicating the recommendable printer, information indicating a printer that has printed a same type of document selected by the selecting unit; and
a display unit adapted to display the information indicating the recommendable printer retrieved by the retrieving unit.

2. A printing system according to claim 1, further comprising:
a counter unit adapted to count a number of prints by the printer corresponding to log stored in the storage unit,
a determination unit adapted to determine a printer that a count value counted by the counter unit is greater than a predetermined threshold.

3. A printing system according to claim 1, further comprising:
a counter unit adapted to count a number of prints by the printer corresponding to log stored in the storage unit,
a determination unit adapted to determine a printer that a count value counted by the counter unit is largest among a plurality of such printers.

4. A printing system according to claim 1, further comprising:
a counter unit adapted to count a number of prints by the printer corresponding to log stored in the storage unit;
a comparing unit adapted to compare print date/time of the document indicated by the log stored in the storage unit, with present date/time,
wherein the counter unit performs counting if a difference between the print date/time and the present date/time is equal to or less than a predetermined threshold and does not perform counting if the difference between the print date/time and the present date/time is greater than the predetermined threshold.

5. A printing system according to claim 1, wherein the display unit displays a print layout having been used for a print of the document selected by the selecting unit.

6. A printing system according to claim 1, wherein the display unit displays another document relating to the document selected by the selecting unit.

7. A printing system according to claim 1, wherein a server apparatus includes the storage unit, the selecting unit, and the retrieving unit, and a client apparatus includes the display unit.

8. A printing system according to claim 1, wherein a server apparatus includes the storage unit, the selecting unit, and the retrieving unit, and a printer apparatus includes the display unit.

9. A printing system according to claim 1, wherein a printer apparatus includes the storage unit, the selecting unit, the retrieving unit, and the display unit.

10. A method for controlling a printing system, comprising:
- a storing step of storing, in a storage unit, a plurality of logs, each of which including data indicating a document that has been printed and data indicating a printer that has printed the document;
- a step of selecting a document to be printed;
- a retrieving step of retrieving information indicating a recommendable printer for printing the document selected by the step of selecting, based on the logs stored in the storage unit, wherein the retrieving step retrieves, as the information indicating the recommendable printer, information indicating a printer that has printed a same type of document selected by the step of selecting; and
- a display step of displaying, on a display unit, the information indicating the recommendable printer retrieved by the step of retrieving.

11. A non-transitory computer-readable storage medium storing a program executable by a computer, the program comprising:
- computer-executable instructions for storing, in a storage unit, a plurality of logs, each of which including data indicating a document that has been printed and data indicating a printer that has printed the document;
- computer-executable instructions for selecting a document to be printed; computer-executable instructions for retrieving information indicating a recommendable printer for printing the document selected by the selecting, based on the logs stored in the storage unit, wherein the retrieving retrieves, as the information indicating the recommendable printer, information indicating a printer that has printed a same type of document selected by the selecting; and
- computer-executable instructions for displaying, on a display unit, the information indicating the recommendable printer retrieved by step the retrieving.

* * * * *